(12) United States Patent
Collopy et al.

(10) Patent No.: US 8,653,785 B2
(45) Date of Patent: Feb. 18, 2014

(54) SYSTEM AND METHOD OF MANAGING POWER AT A PORTABLE COMPUTING DEVICE AND A PORTABLE COMPUTING DEVICE DOCKING STATION

(75) Inventors: Thomas Kevin Collopy, Cary, NC (US); Manjit Singh Gill, San Diego, CA (US); Ronald J. Tessitore, Raleigh, NC (US); Luis Pineda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 12/645,077

(22) Filed: Dec. 22, 2009

(65) Prior Publication Data
US 2010/0244765 A1  Sep. 30, 2010

Related U.S. Application Data

(60) Provisional application No. 61/164,084, filed on Mar. 27, 2009.

(51) Int. Cl.
*H02J 7/00* (2006.01)
*H02J 1/00* (2006.01)
*H02J 9/00* (2006.01)

(52) U.S. Cl.
USPC ............. 320/103; 320/115; 307/43; 307/66

(58) Field of Classification Search
USPC ........ 320/103, 115, 132, 138; 307/43, 44, 45, 307/46, 48, 64, 65, 66, 77, 80
See application file for complete search history.

(56) References Cited

U.S. PATENT DOCUMENTS

| | | | |
|---|---|---|---|
| 5,537,343 | A | 7/1996 | Kikinis et al. |
| 5,625,829 | A | 4/1997 | Gephardt et al. |
| 5,664,228 | A | 9/1997 | Mital |
| 5,721,835 | A | 2/1998 | Niwa et al. |

(Continued)

FOREIGN PATENT DOCUMENTS

| | | |
|---|---|---|
| CN | 1392490 A | 1/2003 |
| CN | 1577206 A | 2/2005 |

(Continued)

OTHER PUBLICATIONS

International Search Report and Written Opinion—PCT/US2010/024424, International Search Authority—European Patent Office—Sep. 30, 2010.

(Continued)

*Primary Examiner* — Richard V Muralidar
(74) *Attorney, Agent, or Firm* — Nicholas A. Cole

(57) ABSTRACT

A method of managing power distribution between a portable computing device (PCD) and a PCD docking station is disclosed and may include determining that the PCD is docked with the PCD docking station, switching a power supply to the PCD from a PCD battery to a PCD docking station battery, and powering the PCD and the PCD docking station from the PCD docking station battery. Further, the method may include determining whether a PCD battery power equals a charge condition and charging the PCD battery when the PCD battery power equals the charge condition. The method may also include monitoring a PCD docking station battery power, determining whether the PCD docking station battery power equals a warning condition, and transmitting a first warning when the PCD docking station battery power equals the warning condition.

20 Claims, 26 Drawing Sheets

(56) References Cited

U.S. PATENT DOCUMENTS

| | | |
|---|---|---|
| 5,867,729 A | 2/1999 | Swonk |
| 5,948,047 A | 9/1999 | Jenkins et al. |
| 6,035,350 A | 3/2000 | Swamy et al. |
| 6,157,958 A | 12/2000 | Armitage et al. |
| 6,231,371 B1 | 5/2001 | Helot |
| 6,272,545 B1 | 8/2001 | Flanagin et al. |
| 6,307,745 B1 | 10/2001 | Liebenow |
| 6,366,450 B1 | 4/2002 | Janicek |
| 6,369,798 B1 | 4/2002 | Yatsu et al. |
| 6,392,383 B1 * | 5/2002 | Takimoto et al. ............... 320/115 |
| 6,418,534 B1 | 7/2002 | Fogle |
| 6,459,968 B1 | 10/2002 | Kochie |
| 6,489,932 B1 | 12/2002 | Chitturi et al. |
| 6,538,880 B1 | 3/2003 | Kamijo et al. |
| 6,549,968 B1 | 4/2003 | Hart |
| 6,560,612 B1 | 5/2003 | Yamada et al. |
| 6,609,207 B1 | 8/2003 | Cromer et al. |
| 6,697,251 B1 | 2/2004 | Aisenberg |
| 6,711,447 B1 | 3/2004 | Saeed |
| 6,831,444 B2 * | 12/2004 | Kobayashi et al. ............ 320/136 |
| 6,932,383 B2 | 8/2005 | Flamm |
| 6,961,237 B2 | 11/2005 | Dickie |
| 7,048,245 B1 | 5/2006 | Voelker |
| 7,054,965 B2 | 5/2006 | Bell et al. |
| 7,197,584 B2 | 3/2007 | Huber et al. |
| 7,224,962 B1 | 5/2007 | Kite |
| 7,231,529 B2 * | 6/2007 | Park ............................. 713/300 |
| 7,231,531 B2 | 6/2007 | Cupps et al. |
| 7,330,923 B2 | 2/2008 | Wenstrand et al. |
| 7,339,783 B2 | 3/2008 | McEwan et al. |
| 7,479,759 B2 * | 1/2009 | Vilanov et al. ................. 320/115 |
| 7,623,892 B2 | 11/2009 | Hawkins |
| 7,765,326 B2 | 7/2010 | Robbin et al. |
| 7,825,626 B2 * | 11/2010 | Kozisek ......................... 320/114 |
| 7,839,119 B2 * | 11/2010 | Onose ........................... 320/113 |
| 7,843,686 B2 | 11/2010 | McEwan et al. |
| 2001/0001083 A1 | 5/2001 | Helot |
| 2002/0087828 A1 | 7/2002 | Arimilli et al. |
| 2002/0157001 A1 | 10/2002 | Huang et al. |
| 2002/0171546 A1 | 11/2002 | Evans et al. |
| 2002/0184297 A1 | 12/2002 | Krancher et al. |
| 2002/0191029 A1 | 12/2002 | Gillespie et al. |
| 2002/0198951 A1 | 12/2002 | Thurlow et al. |
| 2003/0041206 A1 | 2/2003 | Dickie |
| 2003/0065734 A1 | 4/2003 | Ramakesavan |
| 2003/0126335 A1 | 7/2003 | Silvester |
| 2003/0135471 A1 | 7/2003 | Jaquier et al. |
| 2003/0199290 A1 | 10/2003 | Viertola |
| 2003/0227438 A1 | 12/2003 | Campbell et al. |
| 2004/0019724 A1 | 1/2004 | Singleton, Jr. et al. |
| 2004/0037030 A1 | 2/2004 | Kuo et al. |
| 2004/0080899 A1 | 4/2004 | Hill et al. |
| 2004/0224638 A1 | 11/2004 | Fadell et al. |
| 2004/0233624 A1 | 11/2004 | Aisenberg |
| 2004/0268006 A1 | 12/2004 | Kang et al. |
| 2005/0005176 A1 | 1/2005 | Park |
| 2005/0017946 A1 | 1/2005 | Park |
| 2005/0036285 A1 | 2/2005 | Lee et al. |
| 2005/0185364 A1 | 8/2005 | Bell et al. |
| 2006/0122773 A1 | 6/2006 | Nou |
| 2006/0171244 A1 | 8/2006 | Ando |
| 2006/0236014 A1 | 10/2006 | Yin et al. |
| 2007/0021148 A1 | 1/2007 | Mahini |
| 2007/0028226 A1 | 2/2007 | Chen et al. |
| 2007/0073728 A1 | 3/2007 | Klein et al. |
| 2007/0297513 A1 | 12/2007 | Biswas et al. |
| 2007/0300063 A1 | 12/2007 | Adams et al. |
| 2008/0026794 A1 | 1/2008 | Warren |
| 2008/0123285 A1 | 5/2008 | Fadell et al. |
| 2008/0155159 A1 | 6/2008 | Rivas et al. |
| 2008/0209965 A1 | 9/2008 | Maack |
| 2008/0231495 A1 | 9/2008 | Yang et al. |
| 2008/0253079 A1 | 10/2008 | Robinson et al. |
| 2008/0270665 A1 | 10/2008 | Senatori et al. |
| 2008/0272889 A1 | 11/2008 | Symons |
| 2008/0273297 A1 | 11/2008 | Kumar |
| 2009/0021903 A1 | 1/2009 | Chen et al. |
| 2009/0033287 A1 | 2/2009 | Nikazm et al. |
| 2009/0037825 A1 | 2/2009 | Thrasher et al. |
| 2009/0077296 A1 | 3/2009 | Mok et al. |
| 2009/0172478 A1 | 7/2009 | Watanabe et al. |
| 2009/0193151 A1 | 7/2009 | Adams et al. |
| 2009/0253374 A1 | 10/2009 | Matsuo et al. |
| 2009/0328047 A1 | 12/2009 | Li et al. |
| 2010/0064113 A1 | 3/2010 | Lindahl et al. |
| 2010/0169668 A1 | 7/2010 | Gordon-Carroll et al. |
| 2010/0174923 A1 | 7/2010 | Houlihan et al. |
| 2010/0246119 A1 | 9/2010 | Collopy et al. |
| 2010/0250789 A1 | 9/2010 | Collopy et al. |
| 2010/0250816 A1 | 9/2010 | Collopy et al. |
| 2010/0250817 A1 | 9/2010 | Collopy et al. |
| 2010/0250818 A1 | 9/2010 | Gill et al. |
| 2010/0250975 A1 | 9/2010 | Gill et al. |
| 2010/0251243 A1 | 9/2010 | Gill et al. |
| 2010/0251361 A1 | 9/2010 | Collopy et al. |
| 2012/0282858 A1 | 11/2012 | Gill et al. |
| 2013/0145195 A1 | 6/2013 | Collopy et al. |

FOREIGN PATENT DOCUMENTS

| | | |
|---|---|---|
| CN | 1577216 A | 2/2005 |
| CN | 1821934 A | 8/2006 |
| CN | 1892597 A | 1/2007 |
| CN | 1987885 A | 6/2007 |
| CN | 101025806 A | 8/2007 |
| CN | 101256512 A | 9/2008 |
| DE | 19529588 A1 | 2/1997 |
| EP | 0641058 A1 | 3/1995 |
| EP | 0703522 A2 | 3/1996 |
| EP | 0809173 A2 | 11/1997 |
| EP | 1213937 A2 | 6/2002 |
| JP | 7067262 A | 3/1995 |
| JP | 7219903 A | 8/1995 |
| JP | H07219885 A | 8/1995 |
| JP | 8101816 A | 4/1996 |
| JP | 08147278 | 6/1996 |
| JP | 09305249 | 11/1997 |
| JP | 10069338 A | 3/1998 |
| JP | 10091292 A | 4/1998 |
| JP | 10198468 A | 7/1998 |
| JP | H10508397 A | 8/1998 |
| JP | H11345207 A | 12/1999 |
| JP | 2000339097 A | 12/2000 |
| JP | 2001034364 A | 2/2001 |
| JP | 2001142563 A | 5/2001 |
| JP | 2001145073 A | 5/2001 |
| JP | 2001218261 A | 8/2001 |
| JP | 2002185579 A | 6/2002 |
| JP | 2002247172 A | 8/2002 |
| JP | 2002344377 A | 11/2002 |
| JP | 2002374327 A | 12/2002 |
| JP | 2003029885 A | 1/2003 |
| JP | 2003086233 A | 3/2003 |
| JP | 2003140770 A | 5/2003 |
| JP | 2003177839 A | 6/2003 |
| JP | 2003188954 A | 7/2003 |
| JP | 2003196096 A | 7/2003 |
| JP | 2003244315 A | 8/2003 |
| JP | 2003256293 A | 9/2003 |
| JP | 2004015077 A | 1/2004 |
| JP | 2004310515 A | 11/2004 |
| JP | 2005025582 A | 1/2005 |
| JP | 2005033776 A | 2/2005 |
| JP | 2005038300 A | 2/2005 |
| JP | 2005151392 A | 6/2005 |
| JP | 2005275467 A | 10/2005 |
| JP | 2006094182 A | 4/2006 |
| JP | 2006113919 A | 4/2006 |
| JP | 2006127040 A | 5/2006 |
| JP | 2007011487 A | 1/2007 |
| JP | 2007060646 A | 3/2007 |
| JP | 2007074409 A | 3/2007 |
| JP | 2007081988 A | 3/2007 |
| JP | 2007129342 A | 5/2007 |

(56) References Cited

FOREIGN PATENT DOCUMENTS

| | | |
|---|---|---|
| JP | 2007141164 A | 6/2007 |
| JP | 2007251455 A | 9/2007 |
| JP | 2007272760 A | 10/2007 |
| JP | 2008310583 A | 12/2008 |
| JP | 2009037335 A | 2/2009 |
| JP | 2009044618 A | 2/2009 |
| KR | 20050005339 A | 1/2005 |
| RU | 2106051 C1 | 2/1998 |
| RU | 2190938 C2 | 10/2002 |
| RU | 2270532 C2 | 2/2006 |
| RU | 61524 U1 | 3/2007 |
| RU | 68825 U1 | 11/2007 |
| RU | 2313123 C2 | 12/2007 |
| RU | 71175 U1 | 2/2008 |
| RU | 73518 U1 | 5/2008 |
| TW | M317712 U | 8/2007 |
| TW | M321115 U | 10/2007 |
| WO | 9608759 A1 | 3/1996 |
| WO | 02093542 A1 | 11/2002 |
| WO | 2009018125 A1 | 2/2009 |
| WO | 2010110954 | 9/2010 |
| WO | 2010110955 A2 | 9/2010 |
| WO | 2010110959 | 9/2010 |
| WO | 2010110960 | 9/2010 |
| WO | 2010110961 | 9/2010 |
| WO | 2010110962 A2 | 9/2010 |

OTHER PUBLICATIONS

Ricker, Thomas, "ASUS' Eee Keyboard Revealed," Engadget, Jan. 6, 2009, p. 1, downloaded from http://www.engadget.com/2009/01/06/asus-eee-keyboard-revealed/ (as of Nov. 22, 2011).

Walton, Jarred, "CES 2009—ASUS Expands the Eee Family," AnandTech, Jan. 7, 2009, pp. 1-10, downloaded from http://www.anandtech.com/tradeshows/showdoc.aspx"i=3491&p=5 (as of Nov. 22, 2011).

Yamasaki I.,"SMP and ASMP in multiprocessor", Interface, Japan, CQ Publishing Co., Ltd., Aug. 1, 2007, vol. 33, No. 8, p. 65.

Opteron, Wikipedia, the free Encyclopedia (Undated reference), http://web.archive.org/web/20081218211347/http://en.wikipedia.org/wiki/Opteron.

Sekiguchi T., "Increase to Maximum Efficiency with Minimum Hardware Performance—WorkPad is a Light and Compact Information Terminal," Mobile PC, Japan, SoftBank Publishing Inc., vol. 5, No. 12, pp. 36-37, Dec. 1, 1999.

* cited by examiner

SYSTEM AND METHOD OF MANAGING POWER AT A PORTABLE COMPUTING DEVICE AND A PORTABLE COMPUTING DEVICE DOCKING STATION

RELATED APPLICATIONS

The present application claims priority to U.S. Provisional Patent Application Ser. No. 61/164,084, entitled SYSTEM AND METHOD OF MANAGING POWER AT A PORTABLE COMPUTING DEVICE AND A PORTABLE COMPUTING DEVICE DOCKING STATION, filed on Mar. 27, 2009.

CROSS-REFERENCED APPLICATIONS

The present application is related to U.S. patent application Ser. No. 12/644,414, entitle entitled A PORTABLE DOCKING STATION FOR A PORTABLE COMPUTING DEVICE, filed concurrently. The present application is related to U.S. patent application Ser. No. 12/644,443, entitled SYSTEM AND METHOD OF MANAGING MEMORY AT A PORTABLE COMPUTING DEVICE AND A PORTABLE COMPUTING DEVICE DOCKING STATION, filed concurrently. The present application is related to U.S. patent application Ser. No. 12/644,757, entitled SYSTEM AND METHOD OF MANAGING SECURITY BETWEEN A PORTABLE COMPUTING DEVICE AND A PORTABLE COMPUTING DEVICE DOCKING STATION, filed concurrently. The present application is related to U.S. patent application Ser. No. 12/645,055, entitled SYSTEM AND METHOD OF MANAGING DISPLAYS AT A PORTABLE COMPUTING DEVICE AND A PORTABLE COMPUTING DEVICE DOCKING STATION, filed concurrently. The present application is related to U.S. patent application Ser. No. 12/645,276, entitled SYSTEM AND METHOD OF MANAGING DATA COMMUNICATION AT A PORTABLE COMPUTING DEVICE AND A PORTABLE COMPUTING DEVICE DOCKING STATION, filed concurrently. The present application is related to U.S. patent application Ser. No. 12/645,707, entitled SYSTEM AND METHOD OF PROVIDING SCALABLE COMPUTING BETWEEN A PORTABLE COMPUTING DEVICE AND A PORTABLE COMPUTING DEVICE DOCKING STATION, filed Dec. 23, 2009 concurrently. The present application is related to U.S. patent application Ser. No. 12/645,723, entitled SYSTEM AND METHOD OF PROVIDING WIRELESS CONNECTIVITY BETWEEN A PORTABLE COMPUTING DEVICE AND A PORTABLE COMPUTING DEVICE DOCKING STATION, filed Dec. 23, 2009 concurrently. The present application is related to U.S. patent application Ser. No. 12/645,750, entitled SYSTEM AND METHOD OF MANAGING THE EXECUTION OF APPLICATIONS AT A PORTABLE COMPUTING DEVICE AND A PORTABLE COMPUTING DEVICE DOCKING STATION, filed Dec. 23, 2009 concurrently.

FIELD

The present invention generally relates to portable computing devices, and more particularly, to portable computing device docking stations.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. As technology increases, PCDs are becoming increasingly powerful and rival laptop computers and desktop computers in computing power and storage capabilities.

One drawback to using a PCD, however, is the small form factor typically associated therewith. As the PCD gets smaller and is made more easily portable, using the PCD may become increasingly difficult. Further, the small form factor of a PCD may limit the amount of ports, or connections, that may be incorporated in the shell, or housing, of the PCD. As such, even as PCDs become more powerful and have increased capabilities, access to the power and capabilities may be limited by the sizes of the PCDs.

Accordingly, what is needed is an improved for system and method for taking advantage of the computing capabilities provided by a PCD.

SUMMARY OF THE DISCLOSURE

A method of managing power distribution between a portable computing device (PCD) and a PCD docking station is disclosed and may include determining that the PCD is docked with the PCD docking station, switching a power supply to the PCD from a PCD battery to a PCD docking station battery, and powering the PCD and the PCD docking station from the PCD docking station battery. Further, the method may include determining whether a PCD battery power equals a charge condition and charging the PCD battery when the PCD battery power equals the charge condition. The method may also include monitoring a PCD docking station battery power, determining whether the PCD docking station battery power equals a warning condition, and transmitting a first warning when the PCD docking station battery power equals the warning condition.

In this aspect, the method may include determining whether the PCD docking station battery power equals a critical condition and transmitting a second warning when the PCD docking station battery power equals the critical condition. The method may include determining whether an external power source is connected to the PCD docking station, charging the PCD docking station battery when the external power source is connected, switching the power supply to the PCD and the PCD docking station from the PCD docking station battery to the PCD battery, and powering the PCD and the PCD docking station from the PCD battery.

Moreover, the method may include monitoring the PCD battery power and determining whether the PCD battery power equals a power down condition. The method may also be transmitting a third warning when the PCD battery power equals the power down condition and powering down the PCD and the PCD docking station when the PCD battery power equals the power down condition.

In another aspect, a portable computing device is disclosed and may include means for determining that the PCD is docked with the PCD docking station, means for switching a power supply to the PCD from a PCD battery to a PCD docking station battery, and means for powering the PCD and the PCD docking station from the PCD docking station battery. The portable computing device may include means for determining whether a PCD battery power equals a charge condition and means for charging the PCD battery when the PCD battery power equals the charge condition. Also, the portable computing device may include means for monitoring a PCD docking station battery power, means for determining whether the PCD docking station battery power equals a warning condition, and means for transmitting a first warning when the PCD docking station battery power equals the warning condition.

In this aspect, the portable computing device may include means for determining whether the PCD docking station battery power equals a critical condition and means for transmitting a second warning when the PCD docking station battery power equals the critical condition. Further, the portable computing device may include means for determining whether an external power source is connected to the PCD docking station, means for charging the PCD docking station battery when the external power source is connected, means for switching the power supply to the PCD and the PCD docking station from the PCD docking station battery to the PCD battery, and means for powering the PCD and the PCD docking station from the PCD battery.

The portable computing device may also include means for monitoring the PCD battery power and means for determining whether the PCD battery power equals a power down condition. Moreover, the portable computing device may include means for transmitting a third warning when the PCD battery power equals the power down condition and means for powering down the PCD and the PCD docking station when the PCD battery power equals the power down condition.

In another aspect, a portable computing device is disclosed and may include a processor. The processor may be operable to determine that the PCD is docked with the PCD docking station, to switch a power supply to the PCD from a PCD battery to a PCD docking station battery, and to power the PCD and the PCD docking station from the PCD docking station battery. Further, the processor may be operable to determine whether a PCD battery power equals a charge condition and to charge the PCD battery when the PCD battery power equals the charge condition. The processor may also be operable to monitor a PCD docking station battery power, to determine whether the PCD docking station battery power equals a warning condition, and to transmit a first warning when the PCD docking station battery power equals the warning condition.

In this aspect, the processor may be operable to determine whether the PCD docking station battery power equals a critical condition and to transmit a second warning when the PCD docking station battery power equals the critical condition. Also, the processor may be operable to determine whether an external power source is connected to the PCD docking station, to charge the PCD docking station battery when the external power source is connected, to switch the power supply to the PCD and the PCD docking station from the PCD docking station battery to the PCD battery, and to power the PCD and the PCD docking station from the PCD battery.

The processor may be operable to monitor the PCD battery power, to determine whether the PCD battery power equals a power down condition, to transmit a third warning when the PCD battery power equals the power down condition, and to power down the PCD and the PCD docking station when the PCD battery power equals the power down condition.

In another aspect, a computer program product is disclosed and may include a computer-readable medium. The computer-readable medium may include at least one instruction for determining that the PCD is docked with the PCD docking station, at least one instruction for switching a power supply to the PCD from a PCD battery to a PCD docking station battery, and at least one instruction for powering the PCD and the PCD docking station from the PCD docking station battery. Moreover, the computer-readable medium may include at least one instruction for determining whether a PCD battery power equals a charge condition and at least one instruction for charging the PCD battery when the PCD battery power equals the charge condition.

In this aspect, the computer-readable medium may include at least one instruction for monitoring a PCD docking station battery power, at least one instruction for determining whether the PCD docking station battery power equals a warning condition, and at least one instruction for transmitting a first warning when the PCD docking station battery power equals the warning condition. Also, the computer-readable medium may include at least one instruction for determining whether the PCD docking station battery power equals a critical condition and at least one instruction for transmitting a second warning when the PCD docking station battery power equals the critical condition.

The computer-readable medium may further include at least one instruction for determining whether an external power source is connected to the PCD docking station, at least one instruction for charging the PCD docking station battery when the external power source is connected, at least one instruction for switching the power supply to the PCD and the PCD docking station from the PCD docking station battery to the PCD battery, and at least one instruction for powering the PCD and the PCD docking station from the PCD battery.

Additionally, the computer-readable medium may include at least one instruction for monitoring the PCD battery power and at least one instruction for determining whether the PCD battery power equals a power down condition. The computer-readable medium may include at least one instruction for transmitting a third warning when the PCD battery power equals the power down condition and at least one instruction for powering down the PCD and the PCD docking station when the PCD battery power equals the power down condition.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
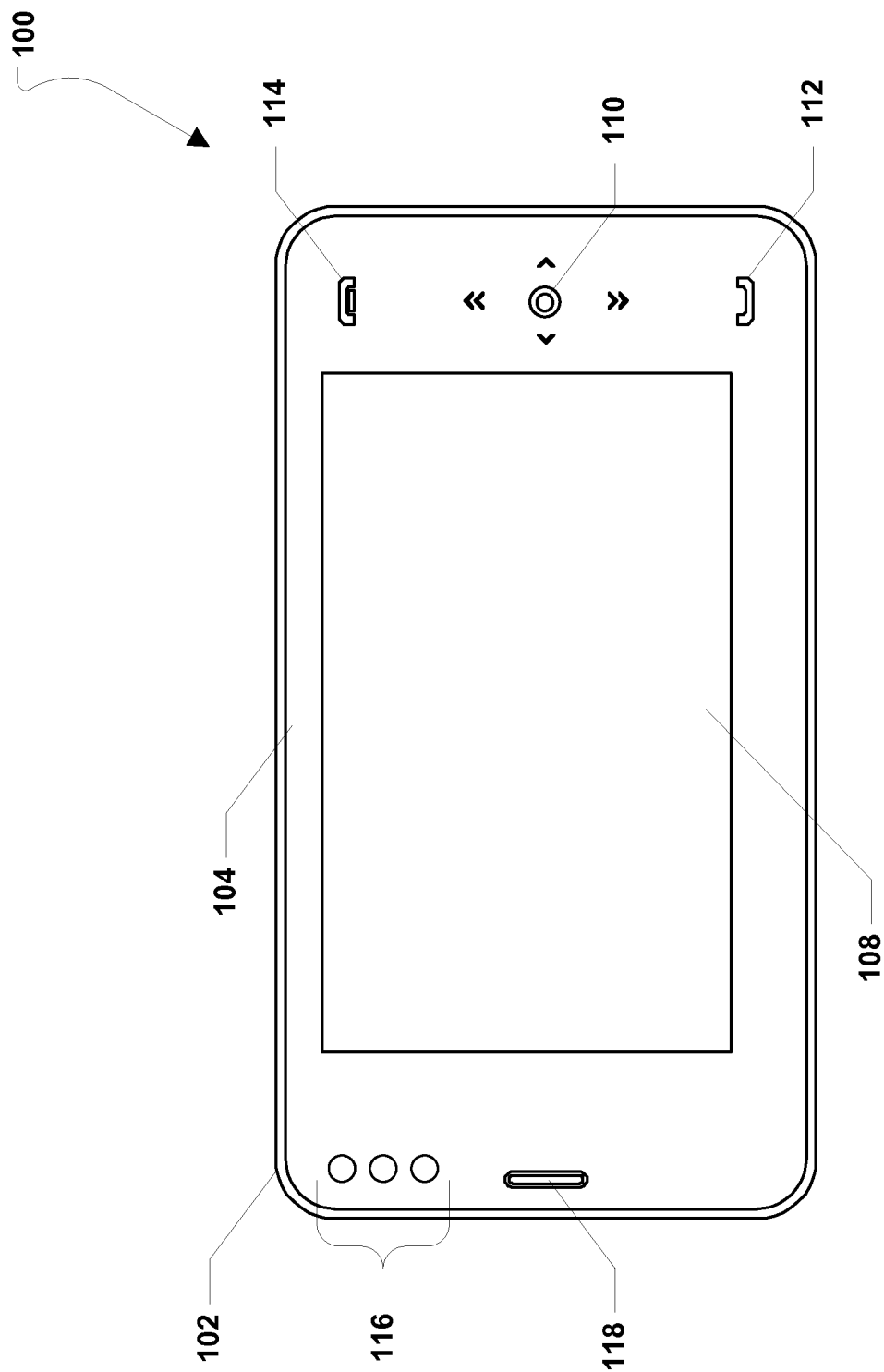
FIG. 1 is a front plan view of a portable computing device (PCD) in a closed position.

Referring initially to FIG. 1 through FIG. 4, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touchscreen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

Figure 2:
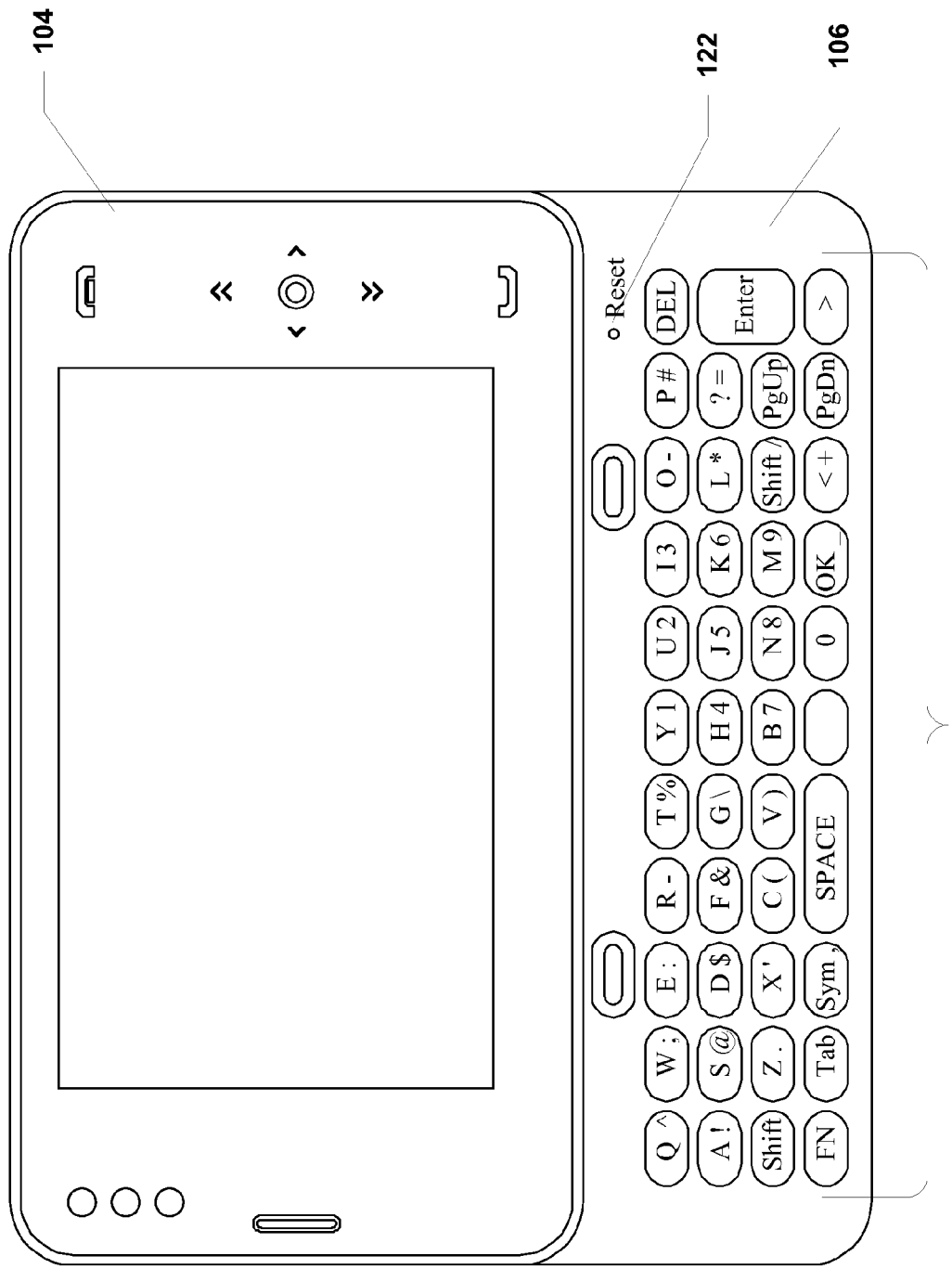
FIG. 2 is a front plan view of a PCD in an open position.

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
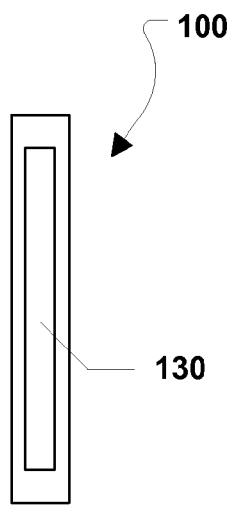
FIG. 3 is a bottom plan view of a PCD.
Figure 4:
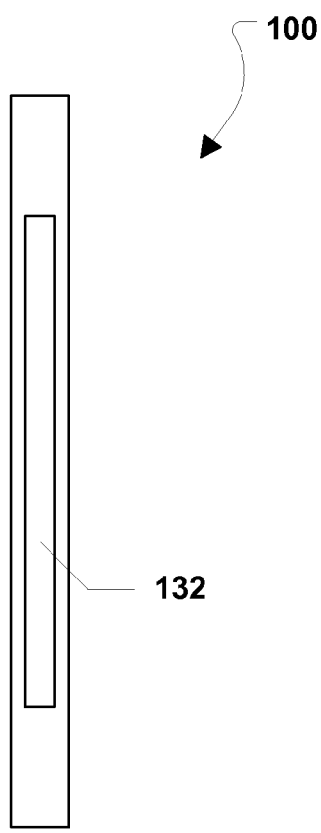
FIG. 4 is a side plan view of a PCD.

As shown in FIG. 3, the PCD 100 may include a multi-pin connector array 130 established, or otherwise disposed, in a short end of the PCD 100, e.g., a bottom of the PCD 100. Alternatively, as illustrated in FIG. 4, the PCD 100 may include a multi-pin connector array 132 established, or otherwise disposed, in a long end of the PCD 100, e.g., a left side of the PCD 100 or a right side of the PCD 100. In a particular aspect, the multi-pin connector array 130, 132 may provide connectivity between the PCD 100 and an aspect of a PCD docking station, described in detail below.

Figure 5:
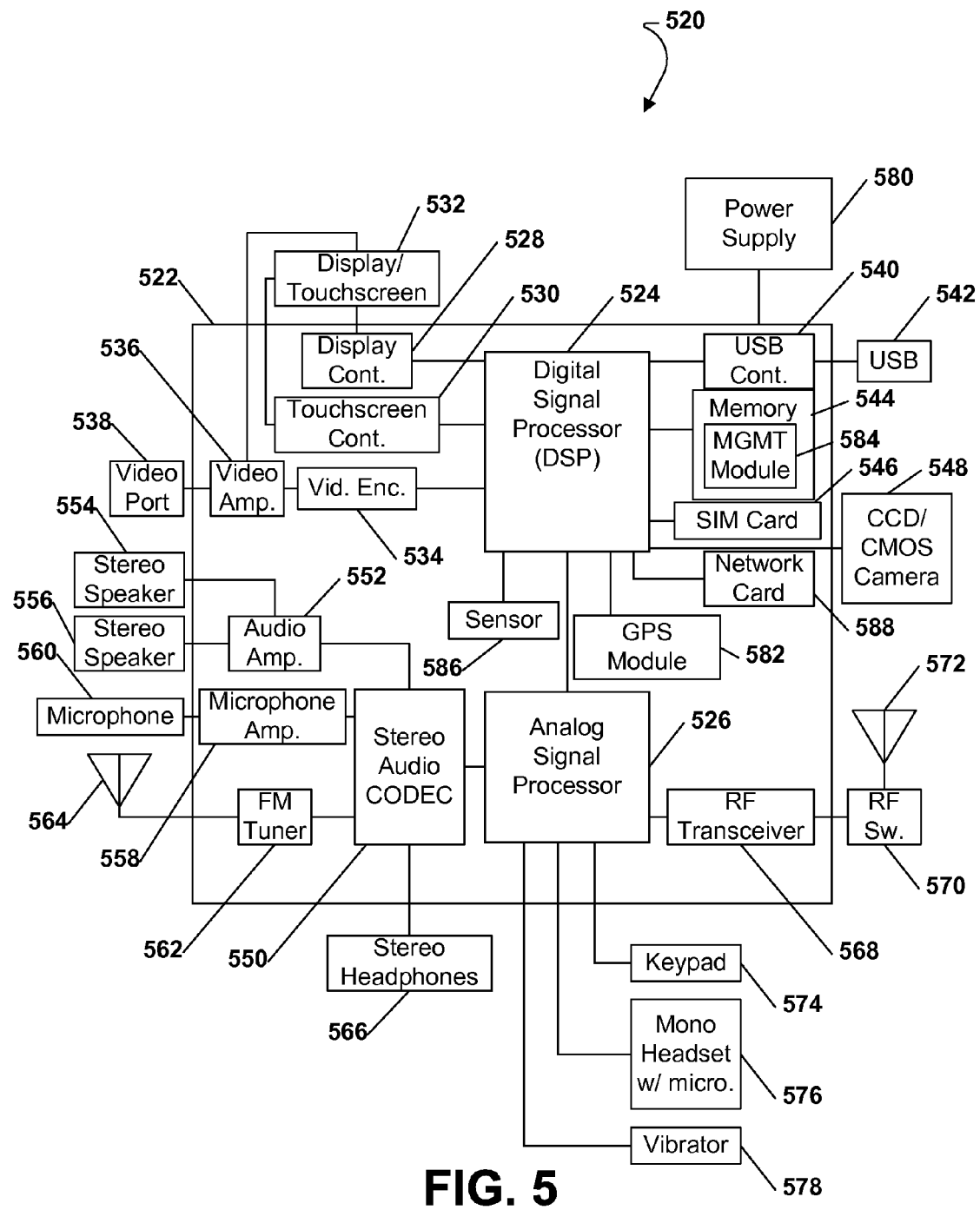
FIG. 5 is a block diagram of a first aspect of a PCD.

Referring to FIG. 5, an exemplary, non-limiting aspect of a portable computing device (PCD) is shown and is generally designated 520. As shown, the PCD 520 includes an on-chip system 522 that includes a digital signal processor 524 and an analog signal processor 526 that are coupled together. The on-chip system 522 may include more than two processors. For example, the on-chip system 522 may include four core processors and an ARM 11 processor, i.e., as described below in conjunction with FIG. 32. It may be appreciated that the on-chip system 522 may include other types of processors, e.g., a CPU, a multi-core CPU, a multi-core DSP, a GPU, a multi-core GPU, or any combination thereof.

As illustrated in FIG. 5, a display controller 528 and a touchscreen controller 530 are coupled to the digital signal processor 524. In turn, a touchscreen display 532 external to the on-chip system 522 is coupled to the display controller 528 and the touchscreen controller 530.

FIG. 5 further indicates that a video encoder 534, e.g., a phase alternating line (PAL) encoder, a sequential couleur a memoire (SECAM) encoder, or a national television system(s) committee (NTSC) encoder, is coupled to the digital signal processor 524. Further, a video amplifier 536 is coupled to the video encoder 534 and the touchscreen display 532. Also, a video port 538 is coupled to the video amplifier 536. As depicted in FIG. 5, a universal serial bus (USB) controller 540 is coupled to the digital signal processor 524. Also, a USB port 542 is coupled to the USB controller 540. A memory 544 and a subscriber identity module (SIM) card 546 may also be coupled to the digital signal processor 524. Further, as shown in FIG. 5, a digital camera 548 may be coupled to the digital signal processor 524. In an exemplary aspect, the digital camera 548 is a charge-coupled device (CCD) camera or a complementary metal-oxide semiconductor (CMOS) camera.

As further illustrated in FIG. 5, a stereo audio CODEC 550 may be coupled to the analog signal processor 526. Moreover, an audio amplifier 552 may coupled to the stereo audio CODEC 550. In an exemplary aspect, a first stereo speaker 554 and a second stereo speaker 556 are coupled to the audio amplifier 552. FIG. 5 shows that a microphone amplifier 558 may be also coupled to the stereo audio CODEC 550. Additionally, a microphone 560 may be coupled to the microphone amplifier 558. In a particular aspect, a frequency modulation (FM) radio tuner 562 may be coupled to the stereo audio CODEC 550. Also, an FM antenna 564 is coupled to the FM radio tuner 562. Further, stereo headphones 566 may be coupled to the stereo audio CODEC 550.

FIG. 5 further indicates that a radio frequency (RF) transceiver 568 may be coupled to the analog signal processor 526. An RF switch 570 may be coupled to the RF transceiver 568 and an RF antenna 572. As shown in FIG. 5, a keypad 574 may be coupled to the analog signal processor 526. Also, a mono headset with a microphone 576 may be coupled to the analog signal processor 526. Further, a vibrator device 578 may be coupled to the analog signal processor 526. FIG. 5 also shows that a power supply 580 may be coupled to the on-chip system 522. In a particular aspect, the power supply 580 is a direct current (DC) power supply that provides power to the various components of the PCD 520 that require power. Further, in a particular aspect, the power supply is a rechargeable DC battery or a DC power supply that is derived from an alternating current (AC) to DC transformer that is connected to an AC power source.

As shown in FIG. 5, the PCD 520 may also include a global positioning system (GPS) module 582. The GPS module 582 may be used to determine the location of the PCD 520. Further, the GPS module 582 may be used to determine whether the PCD 520 is in motion by determining successive location information. Also, based on the successive location information the rate at which the PCD 520 is moving may be determined.

FIG. 5 indicates that the PCD 520 may include a management module 584, e.g., within the memory 544. The management module 584 may be used to manage the power of the PCD, the power of a PCD docking station, or a combination thereof.

Further, in another aspect, the management module 584 may be used to manage the memory 544 within the PCD 520, a memory within a PCD docking station, or a combination thereof. Specifically, the management module 584 may be used to manage one or more applications stored within the PCD 520, one or more content items stored within the PCD 520, one or more applications stored within a PCD docking station, one or more content items stored within a PCD docking station, one or more application download requests received from a PCD 520, one or more content item download requests received from a PCD 520, one or more application download requests received from a PCD docking station, one or more content item download requests received from a PCD docking station, or a combination thereof.

In yet another aspect, the management module 584 may also be used to manage security between the PCD 520 and a PCD docking station, e.g., a mated PCD docking station, an unmated PCD docking station, or a combination thereof. Further, the management module 584 may also be used to manage the display 532 within the PCD 520, a display within a PCD docking station, or a combination thereof. Additionally, the management module 584 may be used to manage calls received at the PCD 520, e.g., while the PCD 520 is docked or undocked with a PCD docking station. The management module 584 may be used to manage calls transmitted from the PCD 520, e.g., while the PCD 520 is docked or undocked with a PCD docking station. The management module 584 may also be used to manage other data transmission to and from the PCD 520 while the PCD 520 is docked or undocked, e.g., via a Wi-Fi network, a WPAN, a cellular network, or any other wireless data network.

In still another aspect, the management module 584 may be used to manage processors within the PCD 520, e.g., when the PCD 520 is docked with a PCD docking station, when the PCD 520 is undocked with a PCD docking station, or a combination thereof. The management module 584 may also be used to manage the execution of applications within the PCD 520 when the PCD is docked or undocked with a PCD docking station. For example, the management module 584 may manage the execution of primary application versions, secondary application versions, standard application versions, enhanced application versions, or a combination thereof.

FIG. 5 indicates that the PCD 520 may further include a sensor 586 connected to the DSP 524. The sensor 586 may be a motion sensor, a tilt sensor, a proximity sensor, a shock sensor, or a combination thereof. The sensor 586 may be used for situational awareness applications. For example, the sensor 586 may be used to detect the motion of a user lifting the PCD 520 to his or her ear and at the apex of the motion automatically connecting an incoming call. Further, the sensor 586 may detect a prolonged lack of motion of the PCD 520 whereas the PCD 520 may be automatically powered down, or placed in a sleep mode. The sensor 586 may remain powered so that when motion is once again detected, the PCD 520 may be switched from the sleep mode, or an off mode, into an active mode.

The sensor 586 may be used with tilt sensing applications. For example, the sensor 586 may be used for user interface applications in which movement is relevant. The sensor 586 may be used to sense picture, or screen, orientation. Further, the sensor 586 may be used to navigate, scroll, browse, zoom, pan, or a combination thereof based on tilt sensing. The sensor 586 may also be used in conjunction with gaming applications. In another application, the sensor 586 may be used for shock detection in order to protect a hard disk drive within the PCD 520 or a hard disk drive within a PCD docking station in which the PCD 520 is docked, or otherwise, engaged. Further, the sensor 586 may be used for tap detection.

FIG. 5 further indicates that the PCD 520 may also include a network card 588 that may be used to access a data network, e.g., a local area network, a personal area network, or any other network. The network card 588 may be a Bluetooth network card, a WiFi network card, a personal area network (PAN) card, a personal area network ultra-low-power technology (PeANUT) network card, or any other network card well known in the art. Further, the network card 588 may be incorporated into a chip, i.e., the network card 588 may be a full solution in a chip, and may not be a separate network card 588.

As depicted in FIG. 5, the touchscreen display 532, the video port 538, the USB port 542, the camera 548, the first stereo speaker 554, the second stereo speaker 556, the microphone 560, the FM antenna 564, the stereo headphones 566, the RF switch 570, the RF antenna 572, the keypad 574, the mono headset 576, the vibrator 578, and the power supply 580 are external to the on-chip system 522.

In a particular aspect, one or more of the method steps described herein may be stored in the memory 544 as computer program instructions. These instructions may be executed by a processor 524, 526 in order to perform the methods described herein. Further, the processors, 524, 526, the display controller 528, the touchscreen controller 530, the memory 544, the management module 584, the network card 588, or a combination thereof may serve as a means for performing one or more of the method steps described herein.

Referring now to FIG. 6 through FIG. 11, a first aspect of a PCD docking station is shown and is generally designated 600. As shown, the PCD docking station 600 may include a housing 602 having a generally flat, boxed shaped lower housing portion 604 and a generally flat, boxed shaped upper housing portion 606. In a particular aspect, the upper housing portion 606 may be connected to the lower housing portion 604 by a first hinge 608 and a second hinge 610. The upper housing portion 606 of the housing 602 may rotate around the hinges 608, 610 with respect to the lower housing portion 604 of the housing 602. Accordingly, the upper housing portion 606 may be rotated, or otherwise moved, relative to the lower housing portion 604 of the housing 602 between a closed position, or closed configuration, shown in FIG. 6 through FIG. 9, and an open position, or open configuration, shown in FIG. 10 and FIG. 11. It may be appreciated that the open position may include a plurality of open positions in which the upper housing portion 606 of the housing 602 is rotated away from the lower housing portion 604 of the housing 602 and disposed at a plurality of angles with respect to the lower housing portion 604 of the housing 602.

Although, the PCD docking station 600 is shown with hinges 608, 610 coupling the upper housing portion 606 to the lower housing portion 604. It may be appreciated that the upper housing portion 606 may be coupled, or otherwise connected, to the lower housing portion 604 via a slide assembly (not shown). The upper housing portion 606 may slide relative to the lower housing portion 604 in order to reveal one or more components within the lower housing portion 604, the upper housing portion 606, or a combination thereof. Further, the upper housing portion 606 and the lower housing portion 604 may snap together or be coupled, or otherwise connected, via various other coupling mechanisms well known in the art.

As shown in FIG. 6 through FIG. 9, the PCD docking station 600 may include a first front foot 612 and a second front foot 614. Further, the PCD docking station 600 may also include a first rear foot 616 and a second rear foot 618. Each foot 612, 614, 616, 618 may be made from a polymer, rubber, or other similar type of material to support the PCD docking station 600 when placed on a desk or table and to prevent the PCD docking station 600 from slipping with respect to the desk or table.

Figure 6:
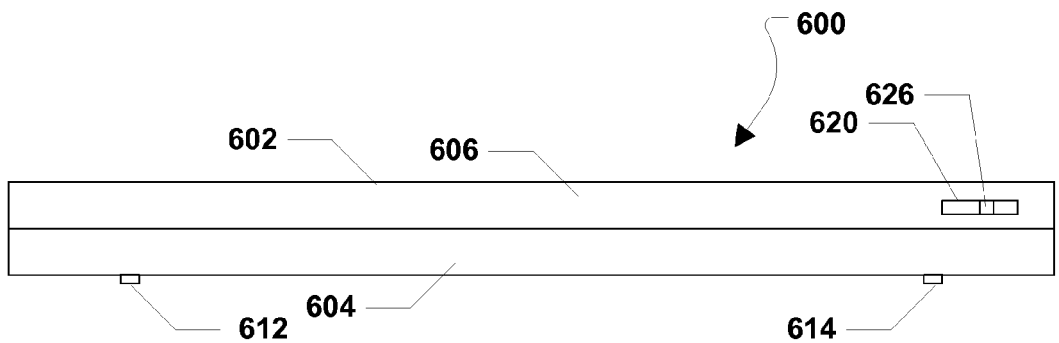
FIG. 6 is a front plan view of a first aspect of a PCD docking station in a closed configuration.
Figure 7:
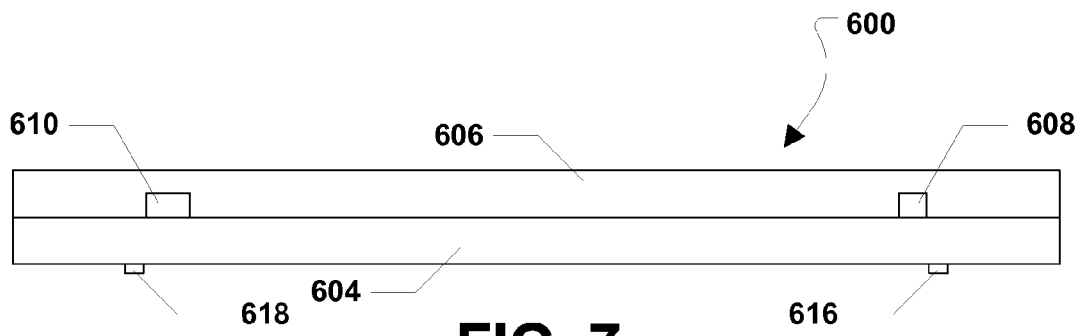
FIG. 7 is a rear plan view of a first aspect of a PCD docking station in a closed configuration.
Figure 8:
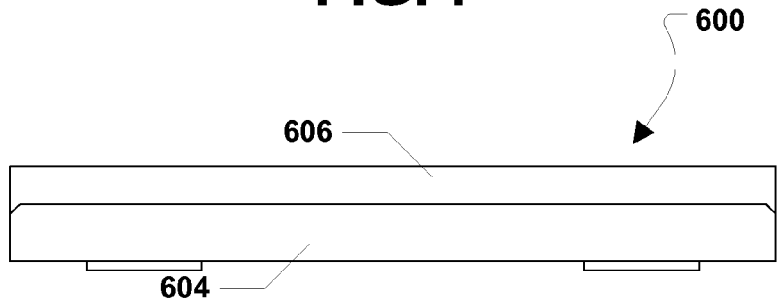
FIG. 8 is a first side plan view of a first aspect of a PCD docking station in a closed configuration.
Figure 10:
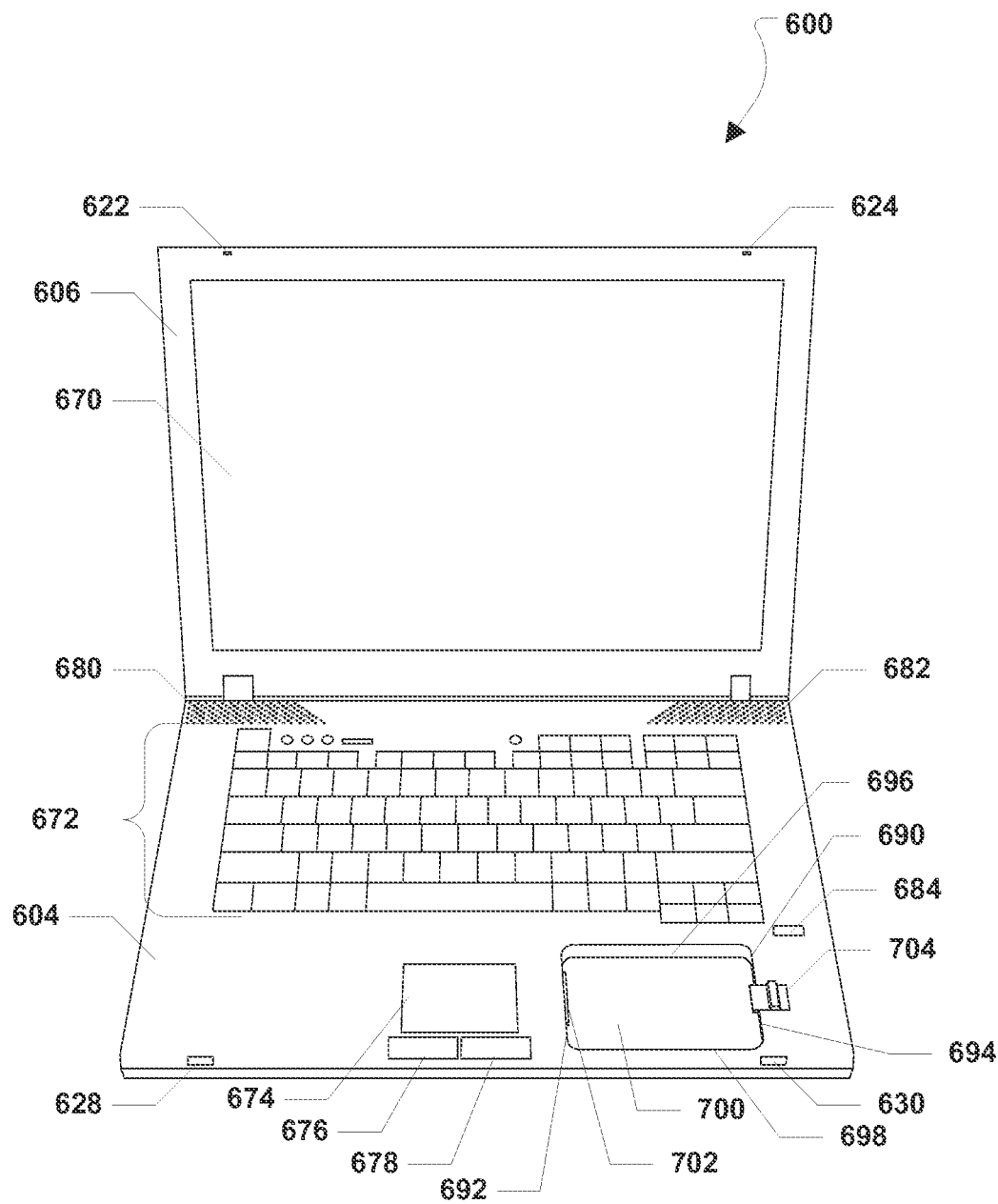
FIG. 10 a front plan view of a first aspect of a PCD docking station in an open configuration.
Figure 11:
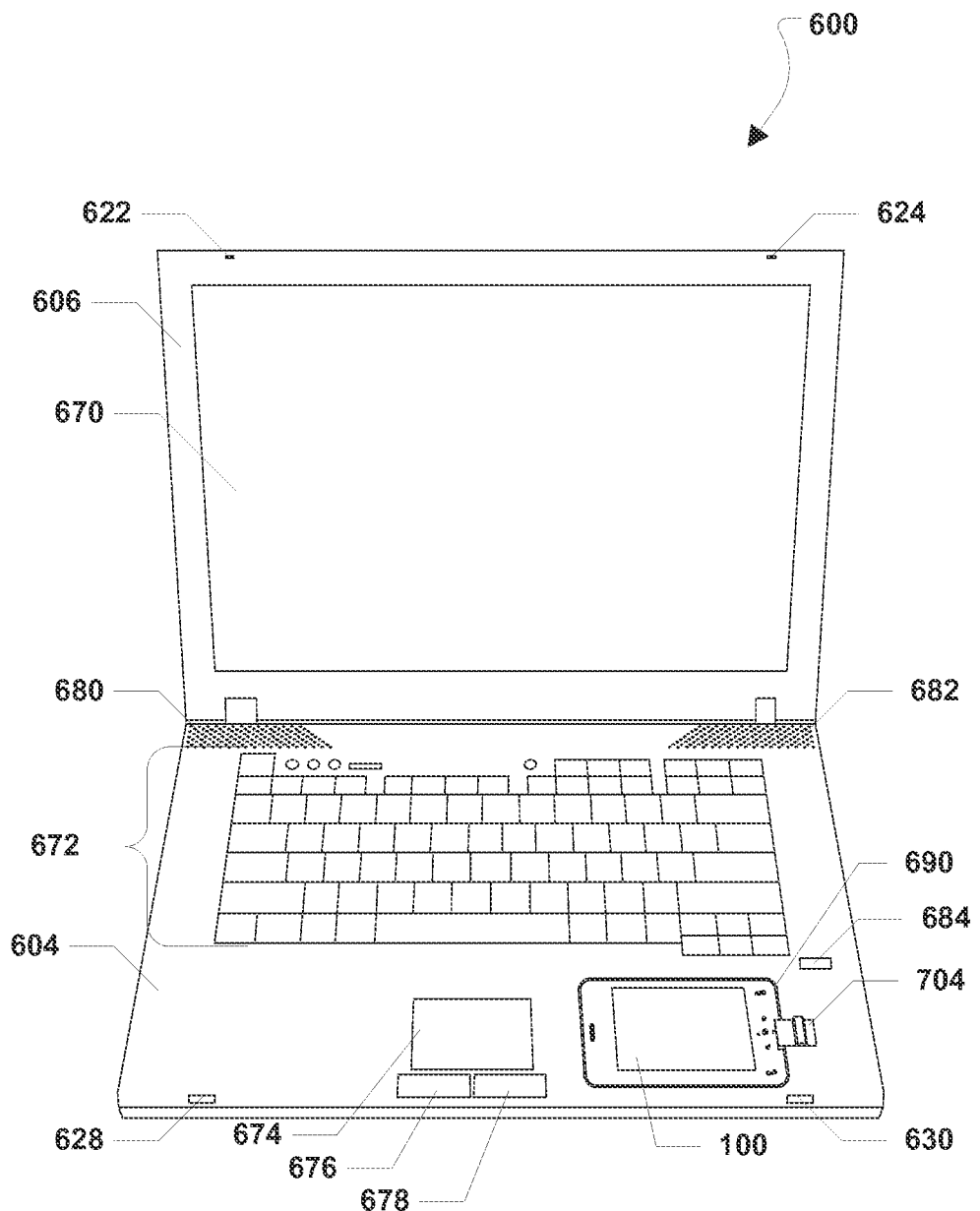
FIG. 11 is a front plan view of a first aspect of a PCD docking station in an open configuration with a PCD docked therewith.

As illustrated in FIG. 6, FIG. 10, and FIG. 11, the PCD docking station 600 may include a latch assembly 620. The latch assembly 620 may include a first hook 622 and a second hook 624 extending from the upper housing portion 606 of the housing 602. The first hook 622 and the second hook 624 may be connected to each other and a slider 626. The latch assembly 620 may also include a first hook pocket 628 and a second hook pocket 630 formed within the lower housing portion 604 of the housing 602. The first hook pocket 628 and the second hook pocket 630 may be sized and shaped to receive and engage the first hook 622 and the second hook 624. The slider 626 may be moved, or otherwise slid, relative to the upper housing portion 606 of the housing 602 in order to release the hooks 622, 624 from the hook pockets 628, 630 and unlock the PCD docking station 600 in order to allow the upper housing portion 606 of the housing 602 to be rotated with respect to the lower housing portion 604 of the housing 602.

Figure 9:
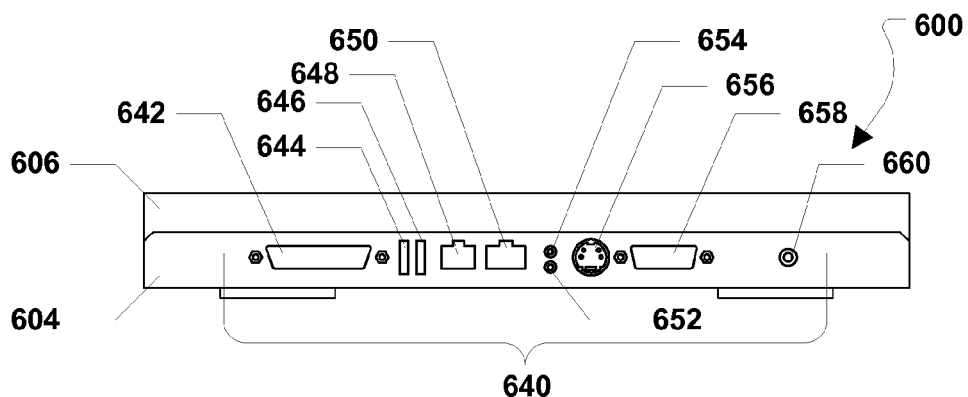
FIG. 9 is a second side plan view of a first aspect of a PCD docking station in a closed configuration.

FIG. 9 illustrates that the lower housing portion 604 of the housing 602 may include a plurality of external device connections 640. For example, the lower housing portion 604 of the housing 602 may include an IEEE 1284 connection 642, a first universal serial bus (USB) connection 644, a second USB connection 646, a registered jack (RJ) 11 connection 648, an RJ-45 connection 650, a microphone jack 652, and a headphone/speaker jack 654. Further, the lower housing portion 604 of the housing 602 may include an S-video connection 656, a video graphics array (VGA) connection 658, and an alternating current (AC) power adapter connection 660. The lower housing portion 604 of the housing 602 may include other connections, described elsewhere herein.

Referring now to FIG. 10 and FIG. 11, the upper housing portion 606 of the PCD docking station 600 may include a display 670 incorporated therein. For example, the display 670 may be a liquid crystal display (LCD), a light emitting diode (LED) display, a backlit-LED display, an organic light emitting diode (OLED) display, or any other type of display. The lower housing portion 604 of the PCD docking station 600 may include a keyboard 672 incorporated therein. The keyboard 672 may be a fully QWERTY keyboard. The lower housing portion 604 of the PCD docking station 600 may include a touch pad mouse 674 incorporated therein. Further, the lower housing portion 604 of the PCD docking station 600 may include a first mouse button 676 and a second mouse button 678 incorporated therein. The mouse buttons 676, 678 may be proximal to the touch pad mouse 674. Additionally, as shown in FIG. 10 and FIG. 11, the lower housing portion 604 of the housing 602 may include a first speaker 680 and a second speaker 682 incorporated therein. The lower housing portion 604 of the housing 602 may also include a fingerprint reader 684 incorporated therein.

As illustrated in FIG. 10, the lower housing portion 604 of the housing 602 may include an open-faced, closed-ended PCD docking pocket 690 formed in the surface thereof. In this aspect, the open-faced, closed-ended PCD docking pocket 690 may be sized and shaped to receive a correspondingly sized and shaped PCD, e.g., the PCD 100 shown in FIG. 1 through FIG. 4. The open-faced, closed-ended PCD docking pocket 690 may be a depression or hole formed in the lower housing portion 604 of the housing 602. As shown, the open-faced, closed-ended PCD docking pocket 690 may be an open space, or a volume, formed within a left side wall 692, a right side wall 694, a rear side wall 696, a front side wall 698, and a bottom surface 700.

FIG. 10 indicates that the open-faced, closed-ended PCD docking pocket 690 may include a multi-pin connector array 702. The multi-pin connector array 702 may be formed in, extend from (or a combination thereof), one of the side walls 692, 694, 696, 698. In the aspect as shown in FIG. 10, the multi-pin connector 702 may extend from the left side wall 692 of the open-faced, closed-ended PCD docking pocket 690. The multi-pin connector array 702 may be sized and shaped to removably engage a correspondingly sized and shaped multi-pin connector array, e.g., the multi-pin connector array 130 illustrated in FIG. 3, the multi-pin connector array 132 illustrated in FIG. 4, a combination thereof, or some other type of multi-pin connector array known in the art.

As shown in FIG. 10 and FIG. 11, the open-faced, closed-ended PCD docking pocket 690 may also include a latch assembly 704 that extends over an edge of one of the side walls 692, 694, 696, 698. In the aspect as shown in FIG. 10 and FIG. 11, the latch assembly 704 may extend over the edge of the right side wall 694 of the open-faced, closed-ended PCD docking pocket 690 opposite the left side wall 692 of the open-faced, closed-ended PCD docking pocket 690. The latch assembly 704 may be spring loaded and slidably disposed in the surface of the lower housing portion 604 of the housing 602. In the aspect as shown, the latch assembly 704 may be moved in a direction, e.g., to the right, in order to allow a PCD, e.g., the PCD 100 shown in FIG. 1 through FIG. 4, to be inserted into the open-faced, closed-ended PCD docking pocket 690. Thereafter, when released, the latch assembly 704 may move in the opposite direction, e.g., to the left. The latch assembly 704 may then engage an upper surface of the PCD 100 in order to maintain the PCD 100 within the PCD docking pocket 690. FIG. 11 illustrates the PCD 100 engaged with the PCD docking station 600.

As shown in FIG. 11, the PCD 100 may be installed within the open-faced, closed-ended docking pocket 690 as described herein. Depending on the orientation of the multi-pin connector array 702, the PCD 100 may be installed face up or face down within the open-faced, closed-ended docking pocket 690. When the PCD 100 is installed within the docking pocket 690, the multi-pin connector array 130 of the PCD 100 may be engaged with the multi-pin connector array 702 formed in the open-faced, closed-ended docking pocket 690. Further, when the PCD 100 is installed face up within the docking pocket 690, the display 670 within the PCD docking station 600 may operate as a primary display and the PCD 100 may operate as a secondary display.

For example, an executing application may be displayed on the primary display and one or more commands may be displayed on the secondary display. In another aspect, in a video mode, video may be displayed on the primary display and a video list and one or more video controls may be displayed on the secondary display. In yet another aspect, in an audio player mode, album art may be displayed on the primary display and one or more audio controls may be displayed in the secondary display.

In a phone mode, a contacts list, a call history, a caller photo, a call number, or a combination thereof may be displayed on the primary display and a numeric keypad may be displayed on the secondary display. When a call occurs, an application manager, e.g., within the PCD 100 may switch from the current application displayed on the secondary display to a phone application displayed on the secondary display. The call may be answered through the PCD 100 by undocking the PCD 100. Alternatively, the call may be answered through the PCD docking station 600, e.g., through the speakers 680, 682 and a microphone connected to the PCD docking station. Moreover, the call may be answered through a headset, e.g., a Bluetooth headset coupled to the PCD 100.

In yet another aspect, in an email application, a current email may be displayed on the primary display and a list of other emails may be displayed on the secondary display. In a game application, the executing game may be displayed on the primary display and the game controls may be displayed on the secondary display.

It may be appreciated that when the PCD 100 is docked with the PCD docking station 600 the combination may be considered a mobile computing device (MCD), e.g., a laptop computing device. Further, the combination of the PCD 100 and the PCD docking station 600 is portable and the housing 602 of the PCD docking station 600 may be closed while the PCD 100 is docked with the PCD docking station 600. Also, the PCD docking station 600 may include a switch, e.g., a push button switch, within the open-faced, closed-ended docking pocket 690. When the PCD 100 is installed within the open-faced, closed-ended docking pocket 690, the PCD 100 can close the switch and cause the PCD docking station 600 to be powered on, e.g., energized. When the PCD 100 is ejected, or otherwise removed, from the open-faced, closed-ended docking pocket 690, the PCD docking station 600 may be powered off. In another aspect, simply engaging the PCD 100 with the multi-pin connector array 702 may cause the PCD docking station 600 to be powered on. Disengaging the PCD 100 from the multi-pin connector array 702 may cause the PCD docking station 600 to be powered off.

Referring now to FIG. 12 through FIG. 15, a second aspect of a PCD docking station is shown and is generally designated 1200. In general, the PCD docking station 1200 shown in FIG. 12 through FIG. 15 is configured in a manner similar to the PCD docking station 600 described in conjunction with FIG. 6 through FIG. 11. However, the PCD docking station 1200 shown in FIG. 12 through FIG. 15 does not include a open-faced, closed-ended PCD docking pocket 690 (FIG. 10).

Figure 12:
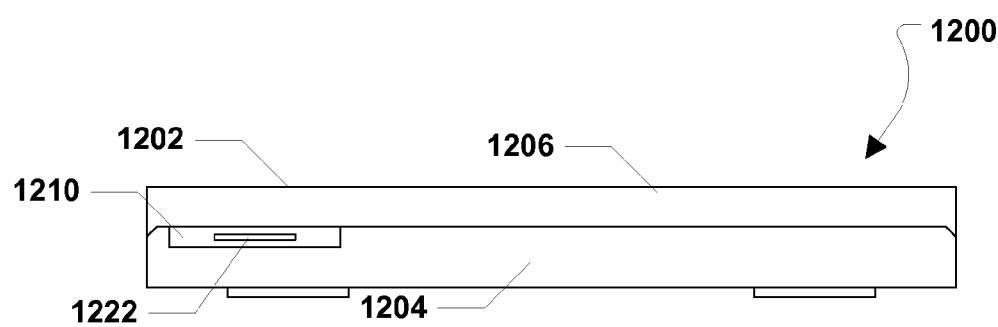
FIG. 12 is a side plan view of a second aspect of a PCD docking station in a closed configuration.
Figure 13:
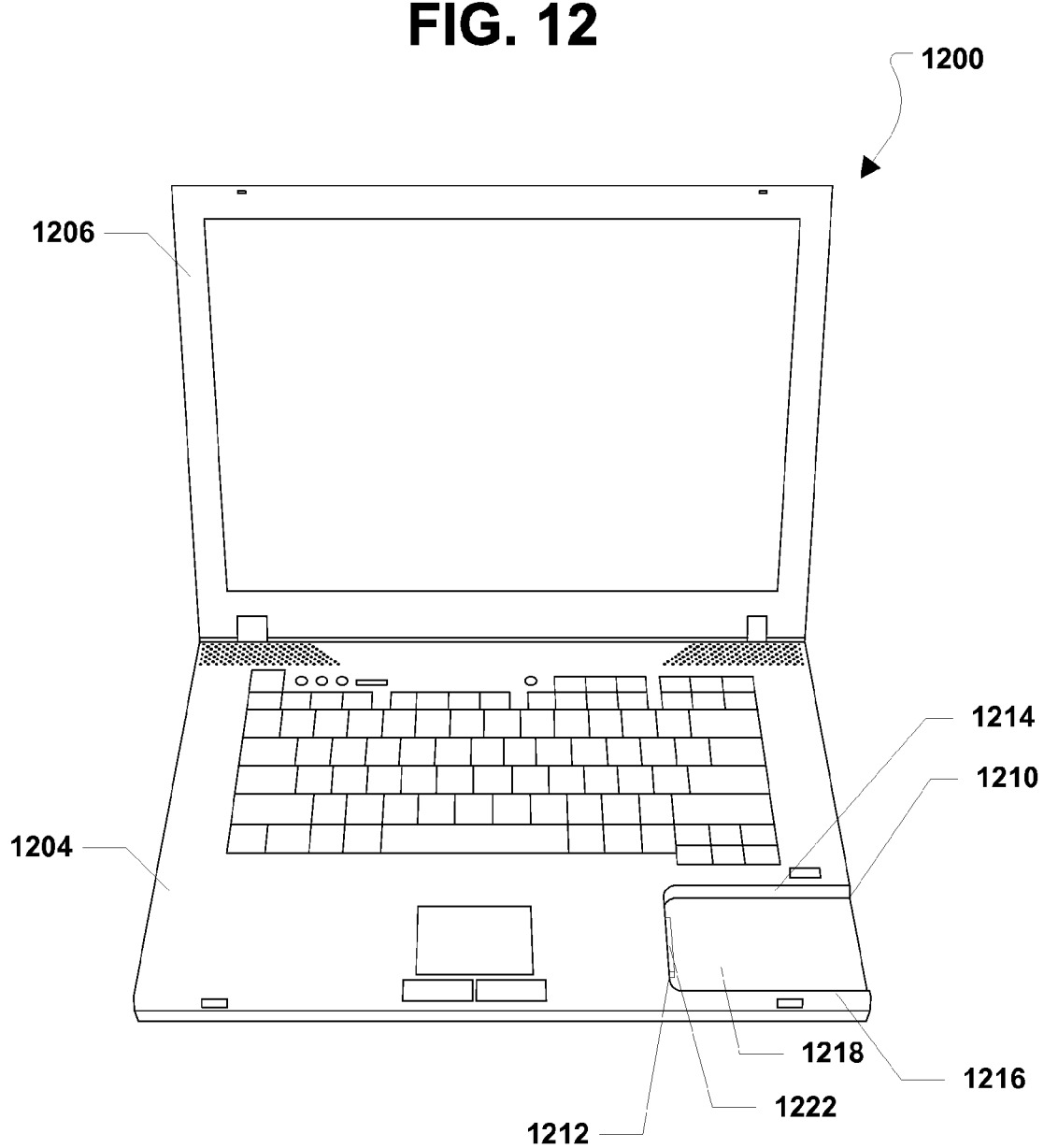
FIG. 13 is a front plan view of a second aspect of a PCD docking station in an open configuration.
Figure 14:
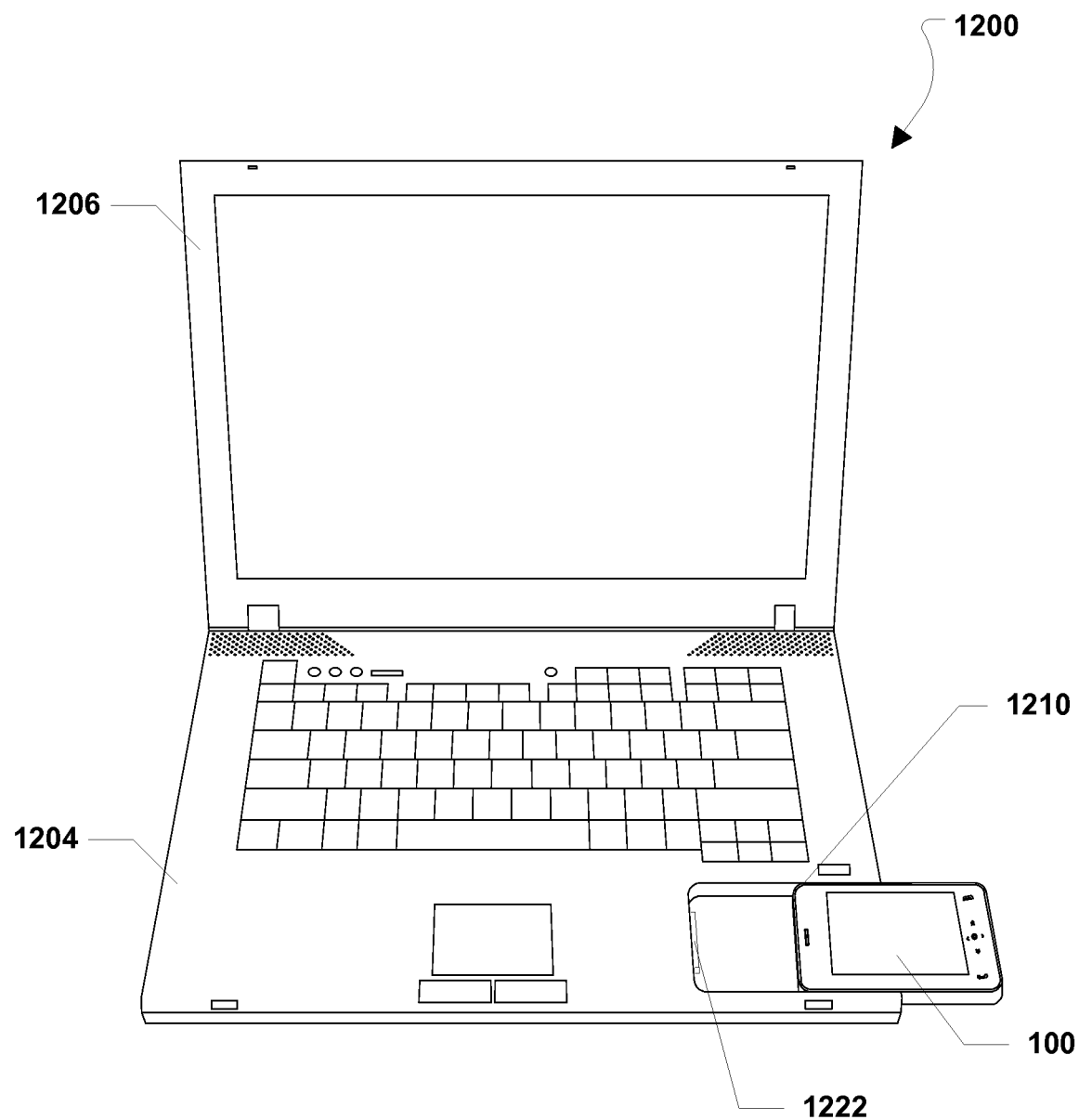
FIG. 14 is a front plan view of a second aspect of a PCD docking station in an open configuration with a PCD partially docked therewith.

As illustrated in FIG. 12, FIG. 13 and FIG. 14, the PCD docking station 1200 may include a housing 1202 having a lower housing portion 1204 and an upper housing portion 1206. In this aspect, the lower housing portion 1204 may include an open-faced, open-ended PCD docking pocket 1210 formed therein. The open-faced, open-ended PCD docking pocket 1210 may be sized and shaped to receive a correspondingly sized and shaped PCD, e.g., the PCD 100 shown in FIG. 1 through FIG. 4. The open-faced, open-ended PCD docking pocket 1210 may be a depression or hole formed in the lower housing portion 1204 of the housing 1202. As shown, the open-faced, open-ended PCD docking pocket 1210 may be an open space, or a volume, formed within a left side wall 1212, a rear side wall 1214, a front side wall 1216, and a bottom surface 1218. Further, the open-faced, open-ended PCD docking pocket 1210 is open on one side, e.g., the right side, in order to allow a PCD to be slid, or otherwise moved, into the open-faced, open-ended PCD docking pocket 1210.

FIG. 12 through FIG. 14 indicate that the open-faced, open-ended PCD docking pocket 1210 may include a multi-pin connector array 1222. The multi-pin connector array 1222 may be formed in, extend from (or a combination thereof), one of the side walls 1212, 1214, 1216. In the aspect as shown in FIG. 12 through FIG. 14, the multi-pin connector 1222 may extend from the left side wall 1212 of the open-faced, open-ended PCD docking pocket 1210. The multi-pin connector array 1222 may be sized and shaped to removably engage a correspondingly sized and shaped multi-pin connector array, e.g., the multi-pin connector array 130 illustrated in FIG. 3, the multi-pin connector array 132 illustrated in FIG. 4, a combination thereof, or some other type of multi-pin connector array known in the art.

Figure 15:
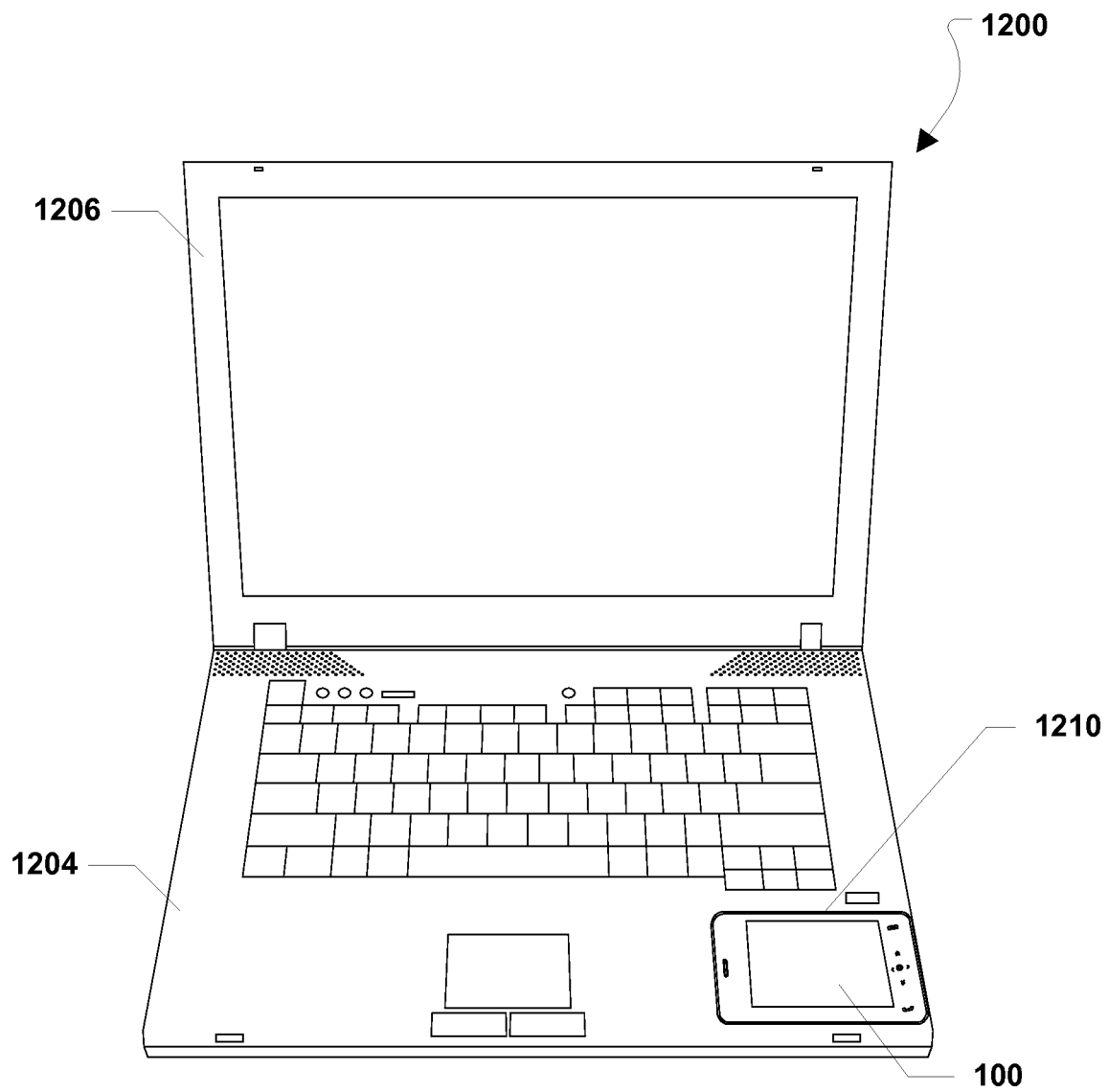
FIG. 15 is a front plan view of a second aspect of a PCD docking station in an open configuration with a PCD docked therewith.

As shown in FIG. 14 and FIG. 15, a PCD, e.g., the PCD 100 shown in FIG. 1 through FIG. 4, may be slid into the open-faced, open-ended PCD docking pocket 1210 from the open, right side of the open-faced, open-ended PCD docking pocket 1210. The PCD may be moved to the left until a multi-pin connector array on the PCD engages the multi-pin connector array 1222 that extends into the open-faced, open-ended PCD docking pocket 1210. When fully engaged with the open-faced, open-ended PCD docking pocket 1210, as depicted in FIG. 15, a touchscreen display within the PCD may be accessible to the user.

Depending on the orientation of the multi-pin connector array 1222, the PCD 100 may be installed face up or face down within the open-faced, open-ended docking pocket 1210. When the PCD 100 is installed face up within the docking pocket 1210, the display within the PCD docking station 1200 may operate as a primary display and the PCD 100 may operate as a secondary display.

It may be appreciated that when the PCD 100 is docked with the PCD docking station 1200 the combination may be considered a mobile computing device (MCD), e.g., a laptop computing device. Further, the combination of the PCD 100 and the PCD docking station 1200 is portable and the housing 1202 of the PCD docking station 1200 may be closed while the PCD 100 is docked with the PCD docking station 1200. Also, the PCD docking station 1200 may include a switch, e.g., a push button switch, within the open-faced, open-ended docking pocket 1210. When the PCD 100 is installed within the open-faced, open-ended docking pocket 1210, the PCD 100 can close the switch and cause the PCD docking station 1200 to be powered on, e.g., energized. When the PCD 100 is ejected, or otherwise removed, from the open-faced, open-ended docking pocket 1210, the PCD docking station 1200 may be powered off. In another aspect, simply engaging the PCD 100 with the multi-pin connector array 1222 may cause the PCD docking station 1200 to be powered on. Disengaging the PCD 100 from the multi-pin connector array 1222 may cause the PCD docking station 1200 to be powered off.

Figure 16:
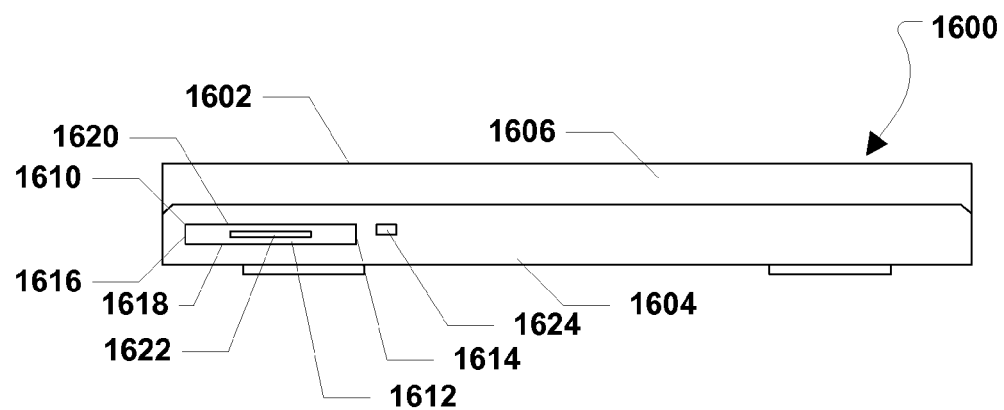
FIG. 16 is a side plan view of a third aspect of a PCD docking station in a closed configuration.
Figure 17:
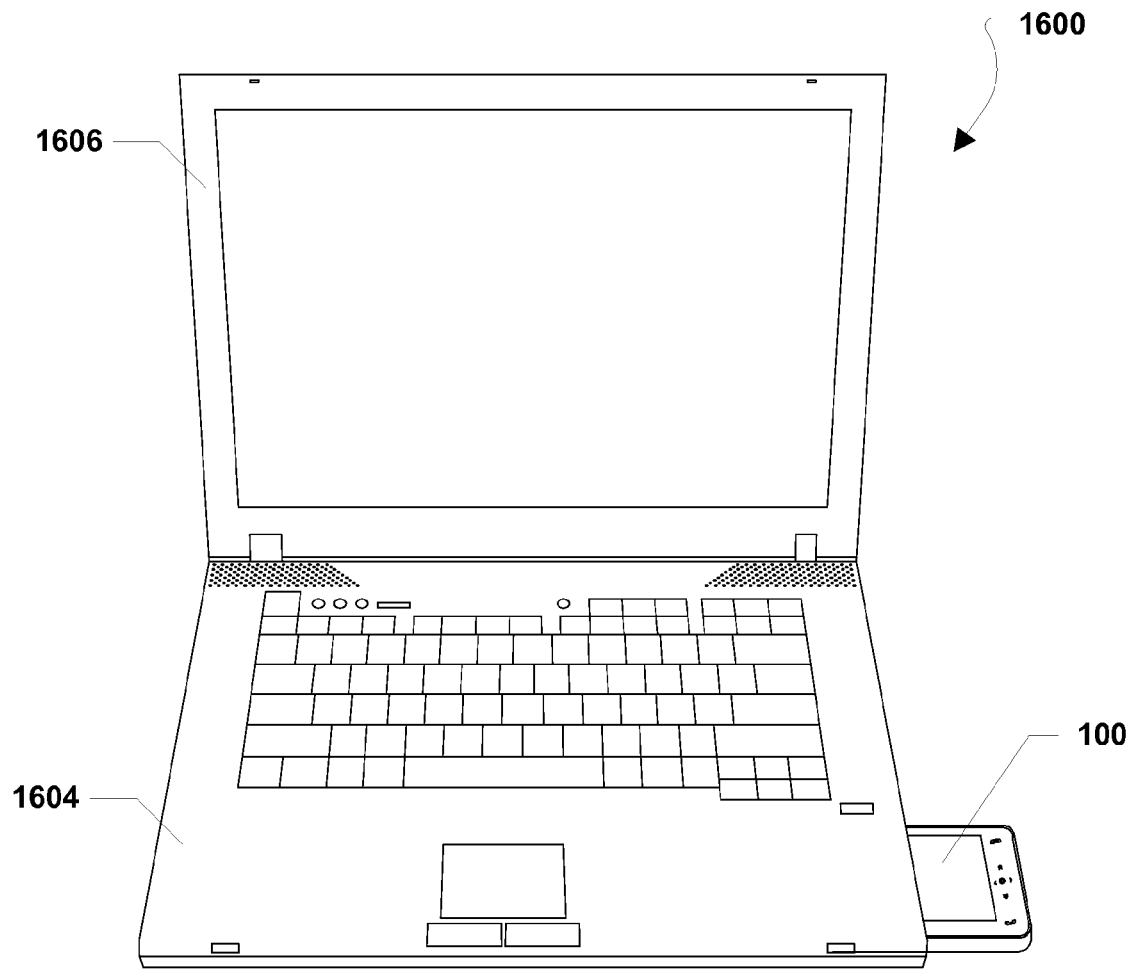
FIG. 17 is a front plan view of a third aspect of a PCD docking station in an open configuration with a PCD partially docked therewith.

FIG. 16 and FIG. 17, illustrate a third aspect of a PCD docking station, generally designated 1600. In general, the PCD docking station 1600 shown in FIG. 16 and FIG. 17 is configured in a manner similar to the PCD docking station 600 described in conjunction with FIG. 6 through FIG. 11. However, the PCD docking station 1600 shown in FIG. 16 and FIG. 17 does not include a open-faced, closed-ended PCD docking pocket 690 (FIG. 10).

As illustrated in FIG. 16 and FIG. 17, the PCD docking station 1600 may include a housing 1602 having a lower housing portion 1604 and an upper housing portion 1606. In this aspect, the lower housing portion 1604 may include a closed-faced, open-ended PCD docking pocket 1610 formed therein. The closed-faced, open-ended PCD docking pocket 1610 may be sized and shaped to receive a correspondingly sized and shaped PCD, e.g., the PCD 100 shown in FIG. 1 through FIG. 4. The closed-faced, open-ended PCD docking pocket 1610 may be a depression or hole formed in the lower housing portion 1604 of the housing 1602. As shown, the closed-faced, open-ended PCD docking pocket 1610 may be an open space, or a volume, formed within a left side wall 1612, a rear side wall 1614, a front side wall 1616, a bottom surface 1618, and a top surface 1620. Further, the closed-faced, open-ended PCD docking pocket 1610 may be open on one side, e.g., the right side, in order to allow a PCD to be slid, or otherwise moved, into the closed-faced, open-ended PCD docking pocket 1610.

FIG. 16 and FIG. 17 indicate that the closed-faced, open-ended PCD docking pocket 1610 may include a multi-pin connector array 1622. The multi-pin connector array 1622 may be formed in, extend from (or a combination thereof), one of the side walls 1612, 1614, 1616. In the aspect as shown in FIG. 16 and FIG. 17, the multi-pin connector 1622 may extend from the left side wall 1612 of the closed-faced, open-ended PCD docking pocket 1610. The multi-pin connector array 1622 may be sized and shaped to removably engage a correspondingly sized and shaped multi-pin connector array, e.g., the multi-pin connector array 130 illustrated in FIG. 3, the multi-pin connector array 132 illustrated in FIG. 4, a combination thereof, or some other type of multi-pin connector array known in the art.

As shown in FIG. 17, a PCD, e.g., the PCD 100 shown in FIG. 1 through FIG. 4, may be slid into the closed-faced, open-ended PCD docking pocket 1610 from the open, right side of the closed-faced, open-ended PCD docking pocket 1610. The PCD 100 may be moved to the left until a multi-pin connector array on the PCD 100 engages the multi-pin connector array 1622 that extends into the closed-faced, open-ended PCD docking pocket 1610. When fully engaged with the closed-faced, open-ended PCD docking pocket 1610, the PCD 100 may not be accessible to the user.

As shown in FIG. 16, the PCD docking station 1600 may further include an eject button 1624. When the eject button 1624 is pressed, the PCD 100 may be ejected from the PCD docking pocket 1610 and the PCD docking station 1600 for retrieval by a user. Depending on the orientation of the multi-pin connector array 1622, the PCD 100 may be installed face up or face down within the closed-faced, open-ended docking pocket 1610. When the PCD 100 is installed within the docking pocket 1610, the multi-pin connector array 130 of the PCD 100 may be engaged with the multi-pin connector array 1622 formed in the closed-faced, open-ended docking pocket 1610.

It may be appreciated that when the PCD 100 is docked with the PCD docking station 1600 the combination may be considered a mobile computing device (MCD), e.g., a laptop computing device. Further, the combination of the PCD 100 and the PCD docking station 1600 is portable and the housing 1602 of the PCD docking station 1600 may be closed while the PCD 100 is docked with the PCD docking station 1600. Also, the PCD docking station 1600 may include a switch, e.g., a push button switch, within the closed-faced, open-ended docking pocket 1610. When the PCD 100 is installed within the closed-faced, open-ended docking pocket 1610, the PCD 100 can close the switch and cause the PCD docking station 1600 to be powered on, e.g., energized. When the PCD 100 is ejected, or otherwise removed, from the closed-faced, open-ended docking pocket 1610, the PCD docking station 1600 may be powered off. In another aspect, simply engaging the PCD 100 with the multi-pin connector array 1622 may cause the PCD docking station 1600 to be powered on. Disengaging the PCD 100 from the multi-pin connector array 1622 may cause the PCD docking station 1600 to be powered off.

Referring to FIG. 18 through FIG. 22, a fourth aspect of a PCD docking station is shown and is generally designated 1800. In general, the PCD docking station 1800 shown in FIG. 18 through FIG. 22 is configured in a manner similar to the PCD docking station 600 described in conjunction with FIG. 6 through FIG. 11. However, the PCD docking station 1800 shown in FIG. 18 through FIG. 22 does not include a open-faced, closed-ended PCD docking pocket 690 (FIG. 10).

As illustrated in FIG. 18 through FIG. 22, the PCD docking station 1800 may include a housing 1802 having a lower housing portion 1804 and an upper housing portion 1806. In this aspect, the lower housing portion 1804 may include a PCD docking tray 1810 extending therefrom. In particular, the PCD docking tray 1810 may be slidably engaged with the lower housing portion 1804 of the PCD docking station 1800. The PCD docking tray 1810 may extend from a side of the lower housing portion 1804, e.g., a left side, a right side, or a front side. In a particular aspect, as shown, the PCD docking tray 1810 may extend outwardly from the right side of the lower housing portion 1804 of the PCD docking station 1800. Further, the PCD docking tray 1810 may be movable between an open position, or extended position, in which the PCD docking tray 1810 is extended from the PCD docking station 1800 and a closed position, or retracted position, in which the PCD is retracted into the PCD docking station 1800.

Figure 19:
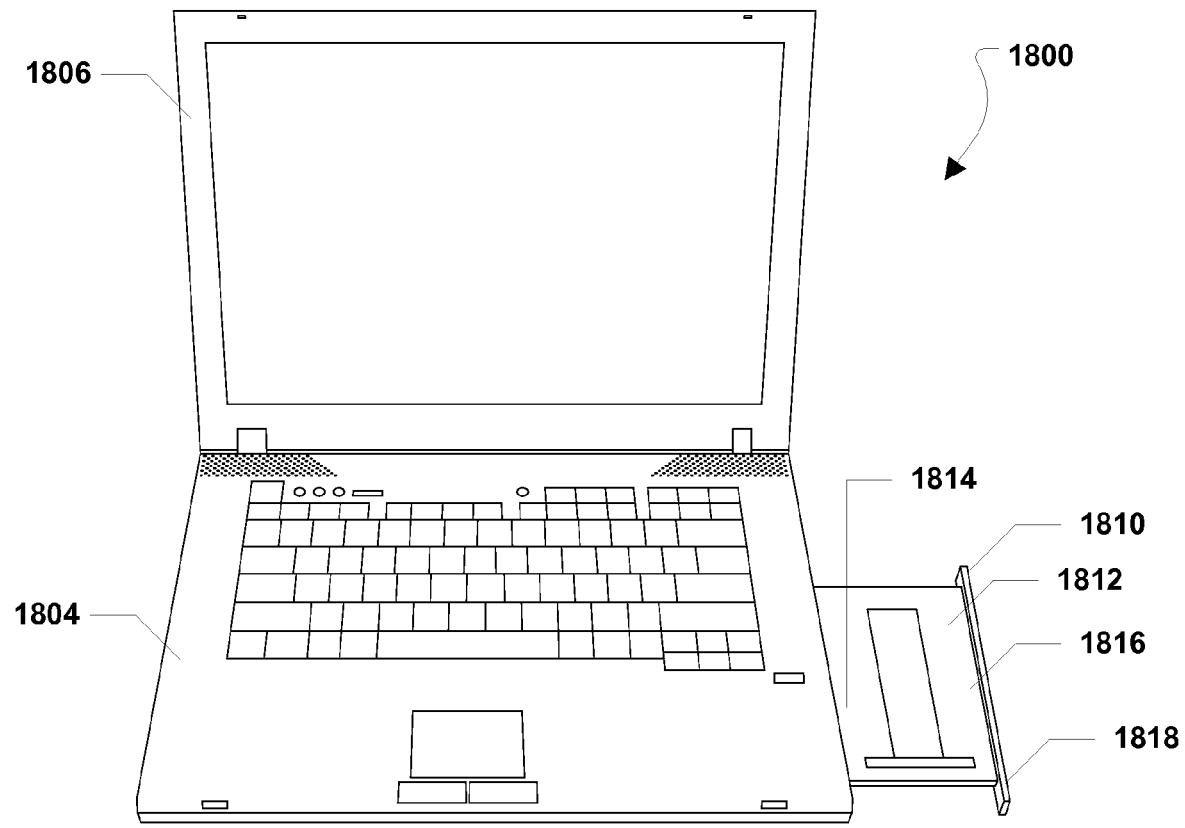
FIG. 19 is a front plan view of a fourth aspect of a PCD docking station in an open configuration with a PCD docking tray in an open position.
Figure 20:
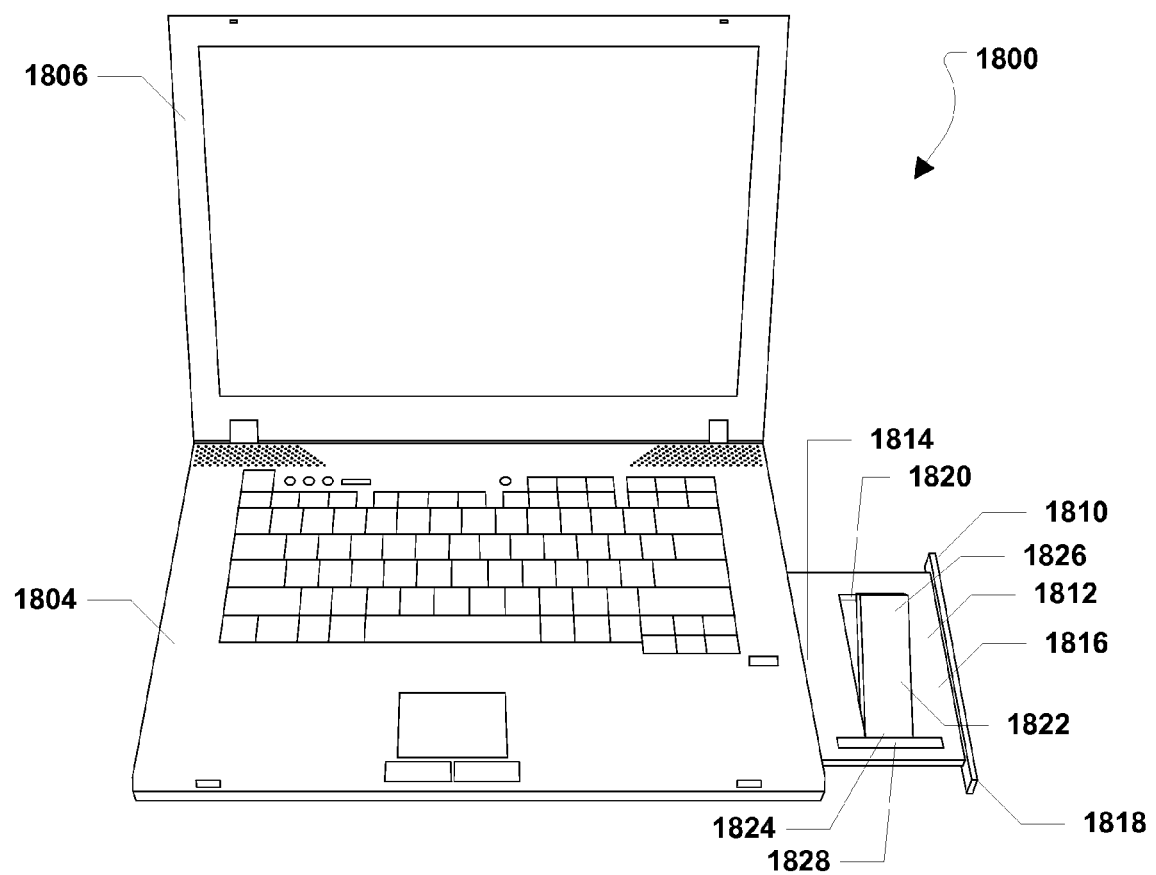
FIG. 20 is a front plan view of a fourth aspect of a PCD docking station in an open configuration with a PCD docking tray in an open position.

The PCD docking tray 1810 may include a generally flat, generally rectangular support plate 1812 having a proximal end 1814 and a distal end 1816. A face plate 1818 may be attached to, or formed with, the distal end 1816 of the support plate 1812. As shown, in a particular aspect, the face plate 1818 may be perpendicular to the support plate 1812. FIG. 19 and FIG. 20 further show that the PCD docking tray 1810 may be formed with a central opening 1820. In a particular aspect, the central opening 1820 may be generally rectangular and may be oriented so that a long axis of the central opening 1820 is substantially parallel to the proximal end 1814 and the distal end 1816 of the support plate 1812.

As shown, the PCD docking tray 1810 may also include a support arm 1822 that is sized and shaped to fit into the central opening 1820 formed in the support plate 1812. The support arm 1822 may be generally rectangular and may include a proximal end 1824 and a distal end 1826. The proximal end 1824 of the support arm 1822 may be connected to the support plate 1812 via a rod or pin (not shown) that passes through the proximal end 1824 of the support arm 1822 and into the support plate 1812 on each side of the central opening 1820 flanking the support arm 1822.

Further, as depicted, the support plate 1812 may include a multi-pin connector array 1828 adjacent to the central opening 1820 and the support arm 1822. In a particular aspect, the multi-pin connector array 1828 may be located adjacent to the proximal end 1824 of the support arm 1822. The multi-pin connector array 1828 may be sized and shaped to removably engage a correspondingly sized and shaped multi-pin connector array on a PCD, e.g., the multi-pin connector array 130 illustrated in FIG. 3, the multi-pin connector array 132 illustrated in FIG. 4, a combination thereof, or some other type of multi-pin connector array known in the art.

In a particular aspect, the PCD docking tray 1810 is movable between an open position, shown in FIG. 19, in which the PCD docking tray 1810 extends fully from within the housing 1802, and a closed position in which the PCD docking tray 1810 is retracted into the housing 1802. In the closed position, the face plate 1818 of the PCD docking tray 1810 may be flush with the side of the housing 1802.

Moreover, in a particular aspect, the support arm 1822 may pivot within the central opening 1820 of the support plate 1812 between a first position and a second position. In the first position, shown in FIG. 19, in which the support arm 1822 fits into the central opening 1820 of the support plate 1812 and the support arm 1822 is flush with the support plate 1812, i.e., an upper surface of the support arm 1822 is even with an upper surface of the support plate 1812, a lower surface of the support arm 1822 is even with a lower surface of the support plate 1812, or a combination thereof.

In the second position, the support arm 1822 may form an angle with respect to the support plate 1812. In a particular aspect, the support arm 1822, the support plate 1812, or a combination thereof may include a detent (not shown), spring (not shown), or other similar mechanism to hold the support arm 1822 in the second position. By applying pressure on the distal end 1826 of the support arm 1822 the force of detent, or spring, may be overcome and the support arm 1822 may be returned to the first position.

Figure 21:
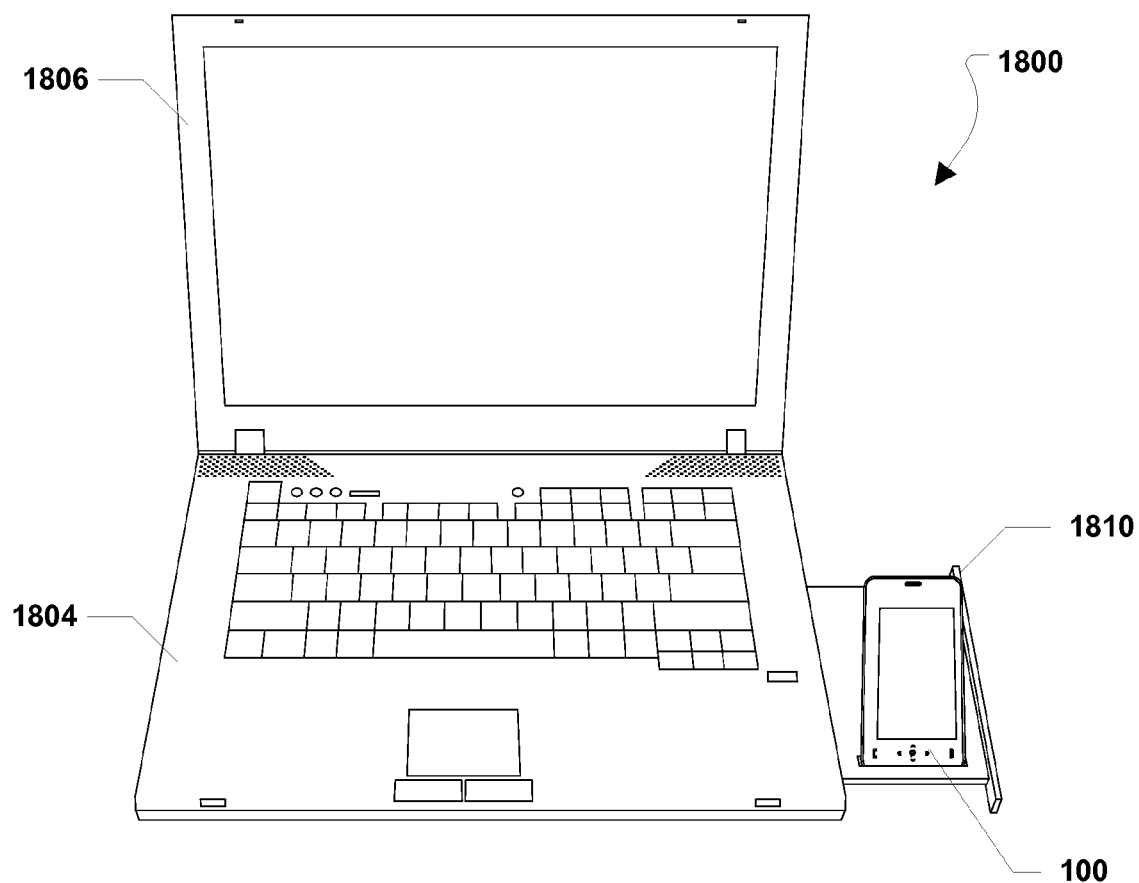
FIG. 21 is a front plan view of a fourth aspect of a PCD docking station in an open configuration with a PCD docking tray in an open position and with a PCD docked therewith.
Figure 22:
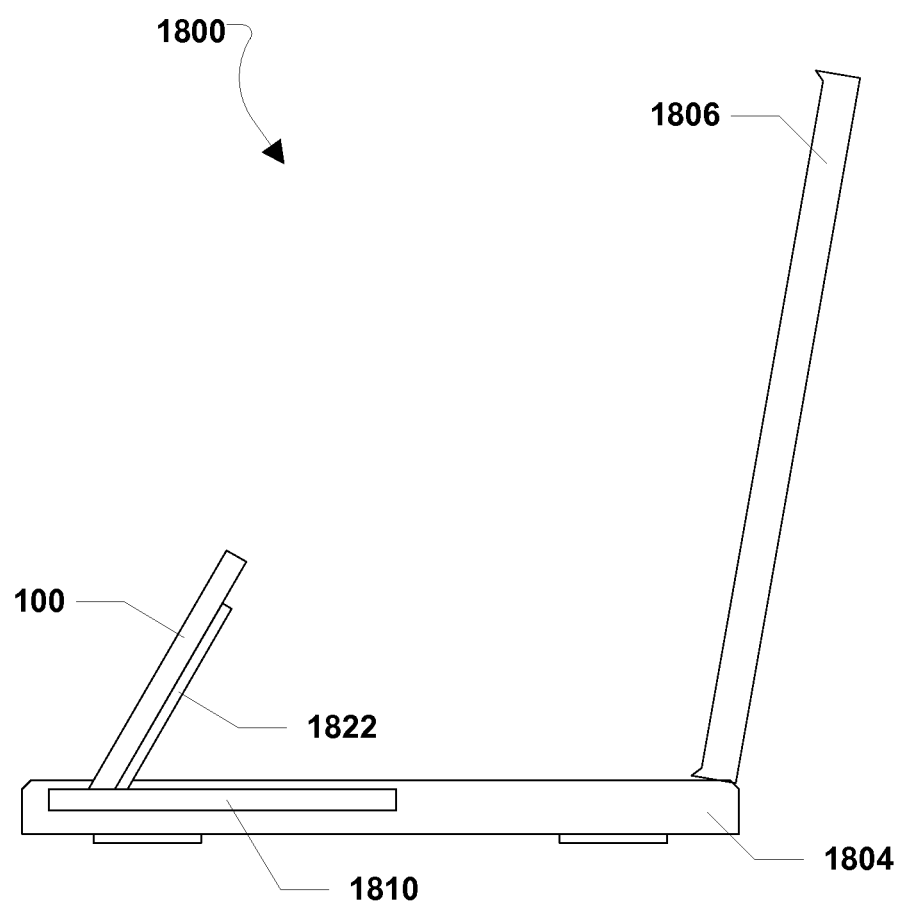
FIG. 22 is a side plan view of a fourth aspect of a PCD docking station in an open configuration with a PCD docking tray in an open position and with a PCD docked therewith.

As shown in FIG. 21 and FIG. 22, in the second position, a PCD, e.g., the PCD 100 shown in FIG. 1 through FIG. 4 may rest on the support arm 1822 and a multi-pin connector array on the PCD 100 may engage the multi-pin connector array 1828 on the PCD docking tray 1810. The support arm 1822 may support the PCD 100 at an angle to facilitate viewing of the PCD 100 during operation of the PCD 100 and the PCD docking station 1800.

Figure 18:
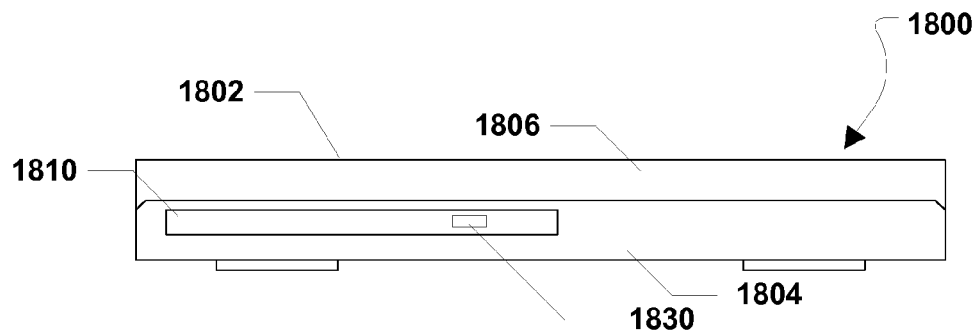
FIG. 18 is a side plan view of a fourth aspect of a PCD docking station in a closed configuration.

In a particular aspect, as shown in FIG. 18, the PCD docking station 1800 may further include an eject button 1830. The eject button 1830 may be incorporated into the PCD docking tray 1810. Alternatively, the eject button 1830 may be incorporated into the PCD docking station 1800 adjacent to the PCD docking tray 1810. When the eject button 1830 is pressed, the PCD docking tray 1810 may be moved from the closed position to the open position. In the open position, the PCD 100 may be docked with and supported by the PCD docking tray 1810.

When the PCD 100 is engaged within the PCD docking tray 1810, the display within the PCD docking station 1800 may operate as a primary display and the PCD 100 may operate as a secondary display.

It may be appreciated that when the PCD 100 is docked with the PCD docking station 1800 the combination may be considered a mobile computing device (MCD), e.g., a laptop computing device. Further, the combination of the PCD 100 and the PCD docking station 1800 is portable.

Figure 23:
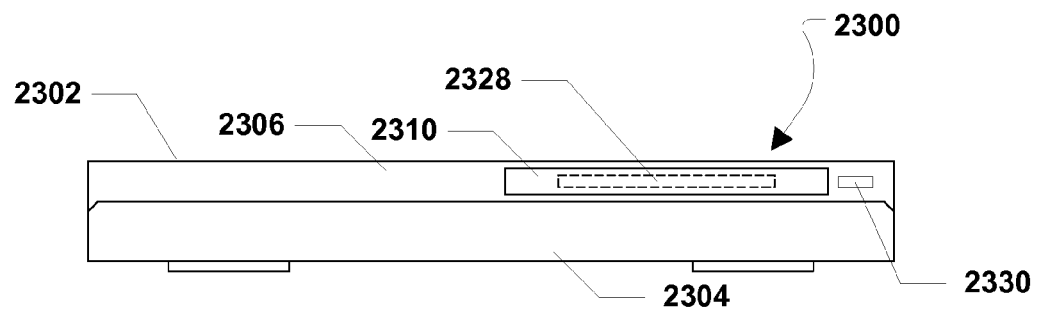
FIG. 23 is a side plan view of a fifth aspect of a PCD docking station in a closed configuration.
Figure 24:
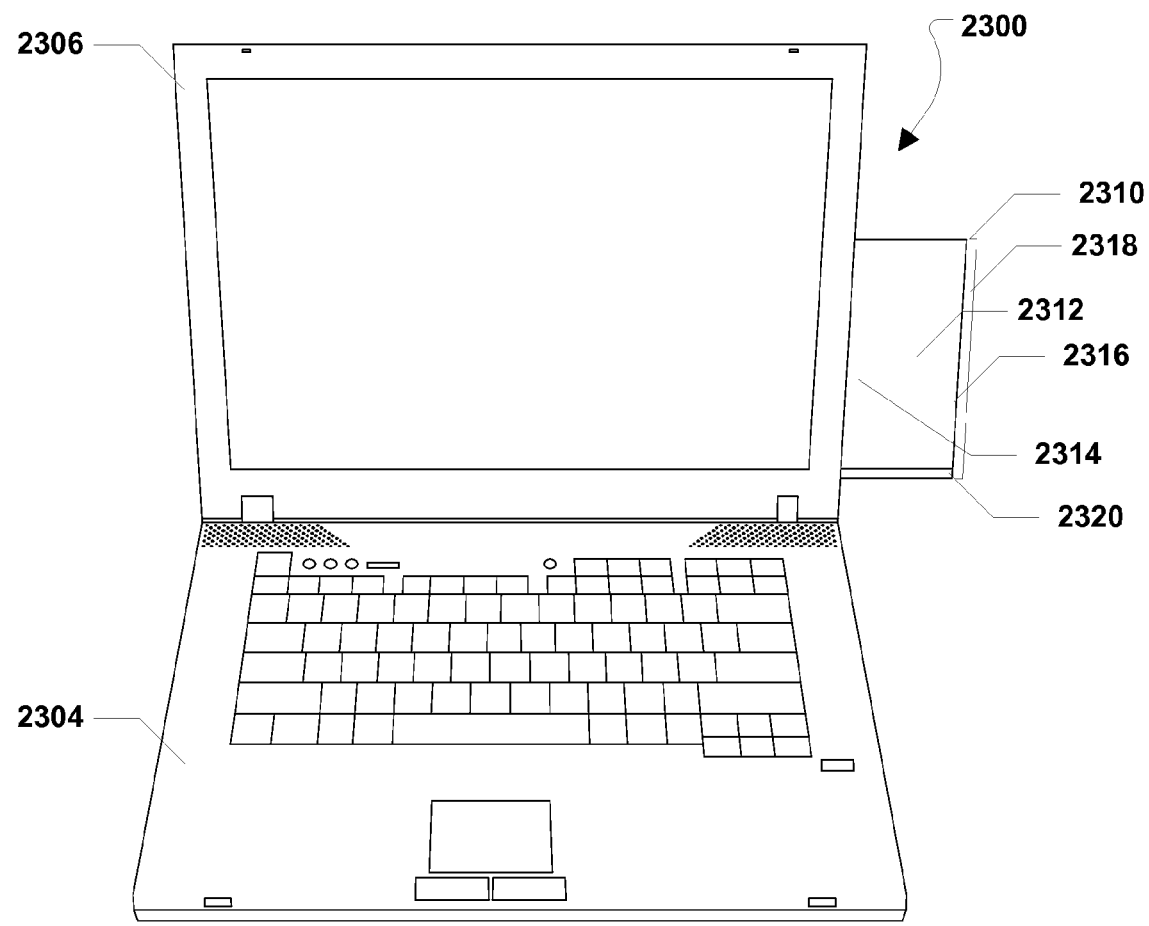
FIG. 24 is a front plan view of a fifth aspect of a PCD docking station in an open configuration with a PCD docking tray in an open position.
Figure 25:
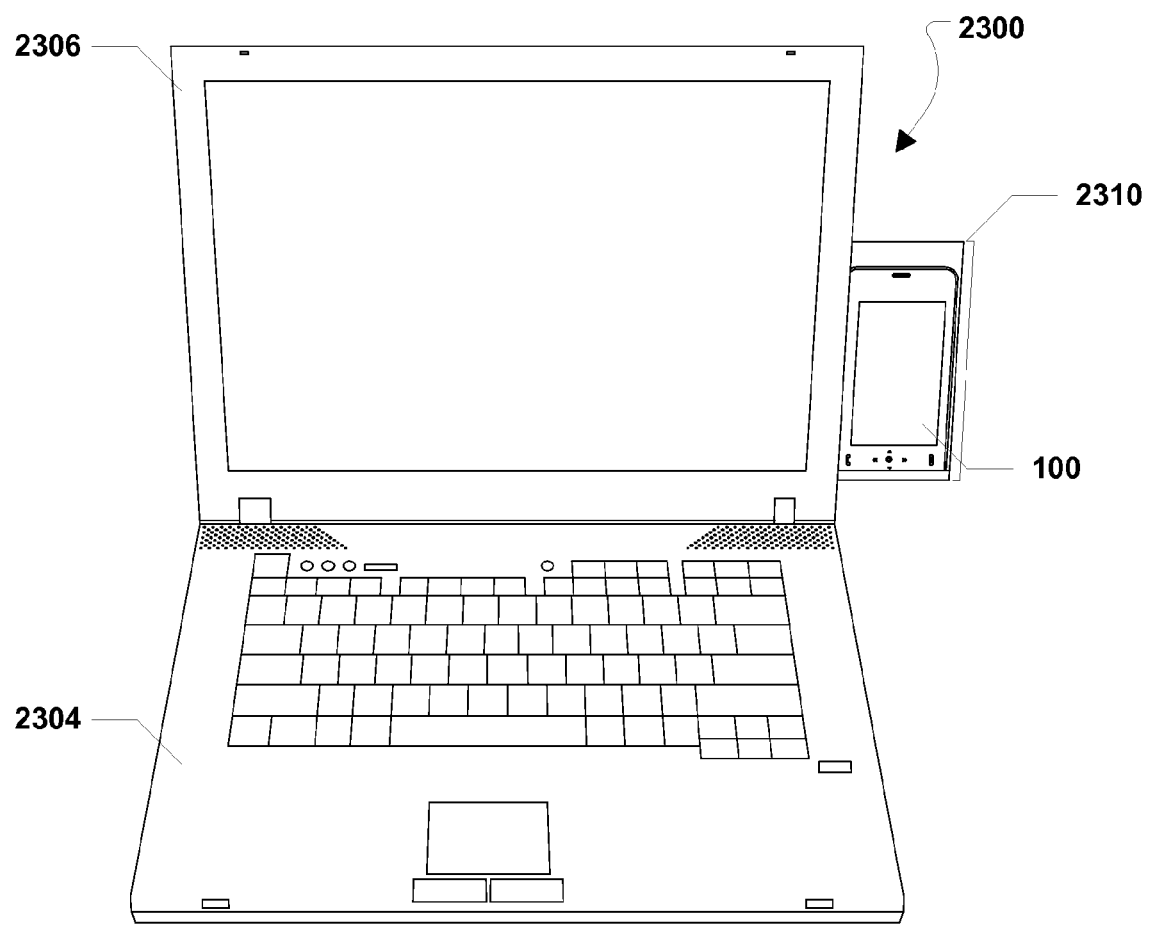
FIG. 25 is a front plan view of a fifth aspect of a PCD docking station in an open configuration with a PCD docking tray in an open position and with a PCD docked therewith.

Referring to FIG. 23 through FIG. 25, a fifth aspect of a PCD docking station is shown and is generally designated 2300. In general, the PCD docking station 2300 shown in FIG. 23 through FIG. 25 is configured in a manner similar to the PCD docking station 600 described in conjunction with FIG. 6 through FIG. 11. However, the PCD docking station 2300 shown in FIG. 23 through FIG. 25 does not include a open-faced, closed-ended PCD docking pocket 690 (FIG. 10).

As illustrated in FIG. 23 through FIG. 25, the PCD docking station 2300 may include a housing 2302 having a lower housing portion 2304 and an upper housing portion 2306. In this aspect, the upper housing portion 2306 may include a PCD docking tray 2310 extending therefrom. In particular, the PCD docking tray 2310 may be slidably engaged with the upper housing portion 2306 of the PCD docking station 2300. The PCD docking tray 2310 may extend from a side of the upper housing portion 2306, e.g., a left side, a right side, or a front side (i.e., a top side when the upper housing portion 2306 is open). In a particular aspect, as shown, the PCD docking tray 2310 may extend outwardly from the right side of the upper housing portion 2306 of the PCD docking station 2300.

The PCD docking tray 2310 may include a generally flat, generally rectangular support plate 2312 having a proximal end 2314 and a distal end 2316. A face plate 2318 may be attached to, or formed with, the distal end 2316 of the support plate 2312. In a particular aspect, the face plate 2318 may be perpendicular to the support plate 2312. FIG. 24 and FIG. 25 further show that the PCD docking tray 2310 may include a support lip 2320 formed along a bottom edge of the support plate 2312. In a particular aspect, the support lip 2320 may be generally "L" shaped and provide a pocket between the support lip 2320 and the support plate 2312 in which an end of a PCD may fit and rest during use.

Further, as depicted in FIG. 23, the upper housing portion 2306 of the PCD docking station 2302 may include a multi-pin connector array 2328 adjacent to the PCD docking tray 2310. In a particular aspect, the multi-pin connector array 2328 may be located adjacent to the proximal end 2314 of the support plate 2312. The multi-pin connector array 2328 may be sized and shaped to removably engage a correspondingly sized and shaped multi-pin connector array on a PCD, e.g., the multi-pin connector array 130 illustrated in FIG. 3, the multi-pin connector array 132 illustrated in FIG. 4, a combination thereof, or some other type of multi-pin connector array known in the art.

In a particular aspect, the PCD docking tray 2310 is movable between a open position, or extended position, shown in FIG. 24, in which the PCD docking tray 2310 extends fully from within the housing 2302, e.g., the upper housing portion 2306, and a closed position, or retracted position, in which the PCD docking tray 2310 is retracted into the housing 2302, e.g., the upper housing portion 2306. In the retracted position, the face plate 2318 of the PCD docking tray 2310 may be flush with the side of the upper housing portion 2306.

In the extended position, as shown in FIG. 25, the PCD 100 may rest on the PCD docking tray 2310 and a multi-pin connector array on the PCD 100 may engage the multi-pin connector array 2328 on the upper housing portion 2306. The PCD docking tray 2310 may support the PCD 100 at the same angle as the upper housing portion 2306 is relative to the lower housing portion 2304 to facilitate viewing of the PCD 100 during operation of the PCD 100 and the PCD docking station 2300.

In a particular aspect, as shown in FIG. 23, the PCD docking station 2300 may further include an eject button 2330. The eject button 2330 may be incorporated into the PCD docking station 2300 adjacent to the PCD docking tray 2310. Alternatively, the eject button 2330 may be incorporated into the PCD docking tray 2310. When the eject button 2330 is pressed, the PCD docking tray 2310 may be moved from the closed position to the open position. In the open position, the PCD 100 may be docked with and supported by the PCD docking tray 2310.

When the PCD 100 is engaged within the PCD docking tray 2310, the display within the PCD docking station 2300 may operate as a primary display and the PCD 100 may operate as a secondary display.

It may be appreciated that when the PCD 100 is docked with the PCD docking station 2300 the combination may be considered a mobile computing device (MCD), e.g., a laptop computing device. Further, the combination of the PCD 100 and the PCD docking station 2300 is portable.

Figure 26:
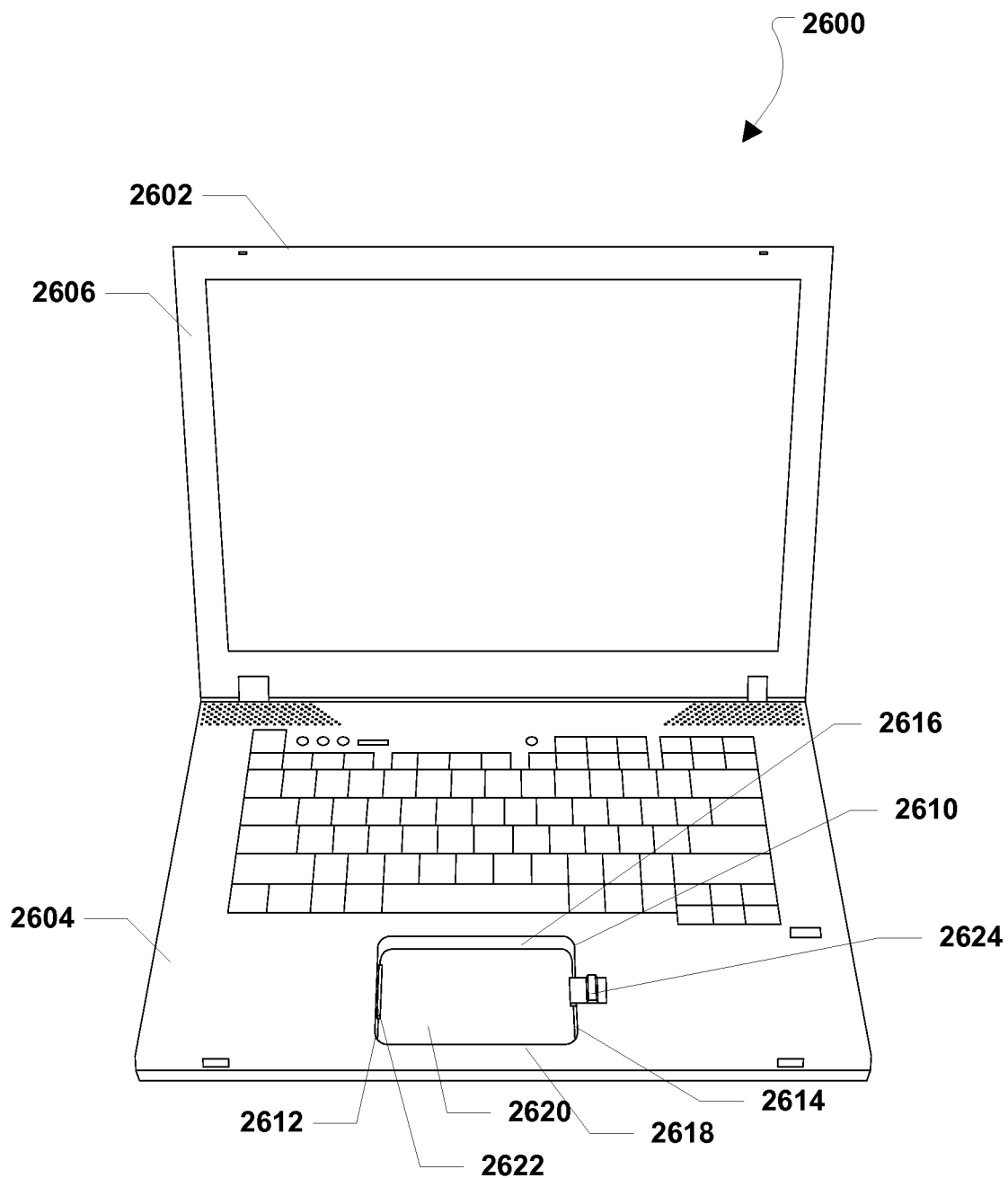
FIG. 26 is a front plan view of a sixth aspect of a PCD docking station in an open configuration.
Figure 27:
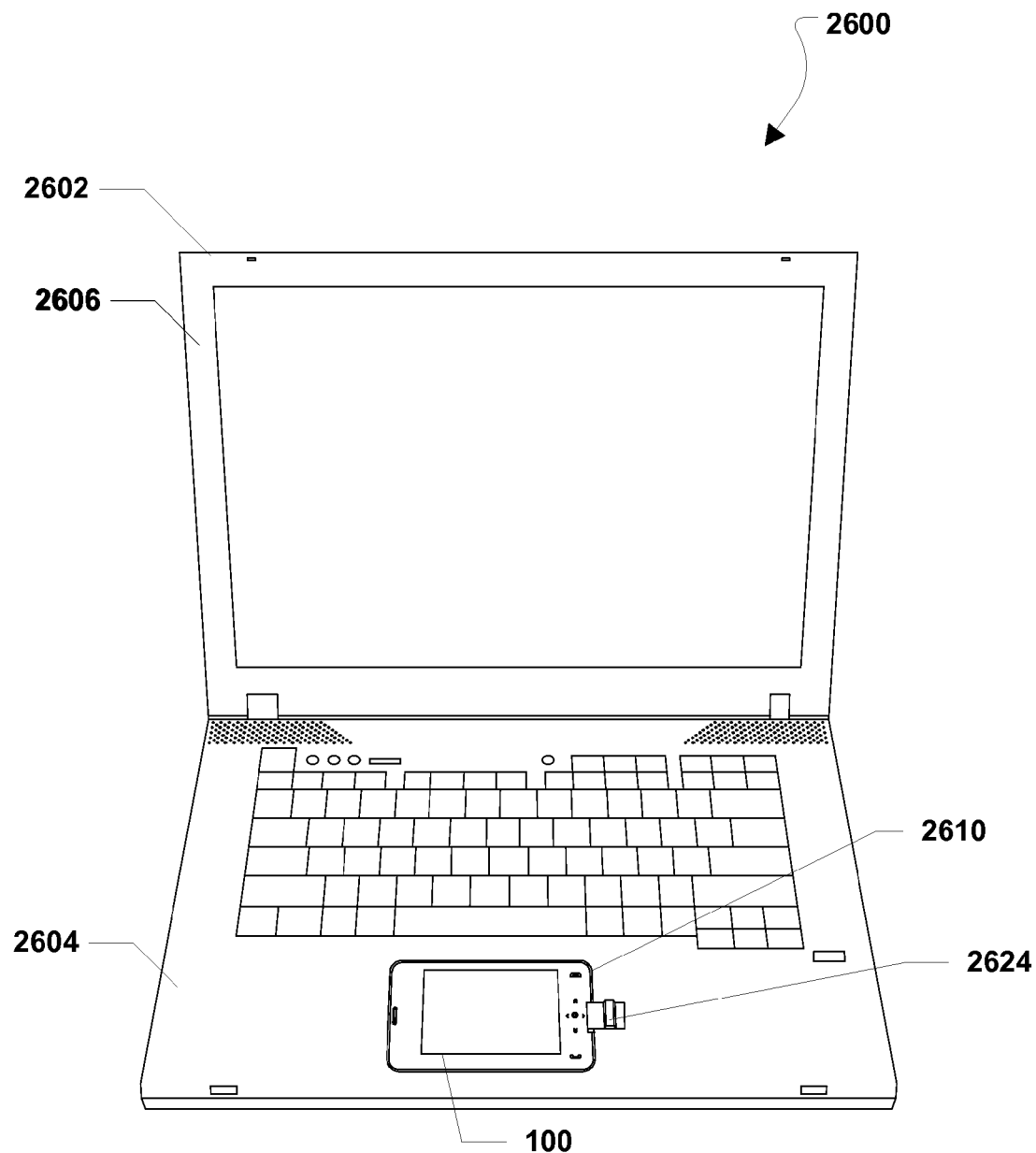
FIG. 27 is a front plan view of a sixth aspect of a PCD docking station in an open configuration with a PCD docked therewith.

Referring now to FIG. 26 and FIG. 27, a sixth aspect of a PCD docking station is shown and is generally designated 2600. In general, the PCD docking station 2600 shown in FIG. 26 and FIG. 27 is configured in a manner similar to the PCD docking station 600 described in conjunction with FIG. 6 through FIG. 11. However, the PCD docking station 2600 shown in FIG. 26 and FIG. 27 does not include a touch pad mouse 674, a first mouse button 676, a second mouse button 678, or a combination thereof.

As illustrated in FIG. 26 and FIG. 27, the PCD docking station 2600 may include a housing 2602 having a lower housing portion 2604 and an upper housing portion 2606. The lower housing portion 2604 of the housing 2602 may include an open-faced, closed-ended PCD docking pocket 2610 formed in the surface thereof. In this aspect, the open-faced, closed-ended PCD docking pocket 2610 may be sized and shaped to receive a correspondingly sized and shaped PCD, e.g., the PCD 100 shown in FIG. 1 through FIG. 4.

In a particular aspect, the open-faced, closed-ended PCD docking pocket 2610 may be a depression or hole formed in the lower housing portion 2604 of the housing 2602. As shown, the open-faced, closed-ended PCD docking pocket 2610 may be an open space, or a volume, formed within a left side wall 2612, a right side wall 2614, a rear side wall 2616, a front side wall 2618, and a bottom surface 2620.

FIG. 26 indicates that the open-faced, closed-ended PCD docking pocket 2610 may include a multi-pin connector array 2622. The multi-pin connector array 2622 may be formed in, extend from (or a combination thereof), one of the side walls 2612, 2614, 2616, 2618. In the aspect as shown in FIG. 26, the multi-pin connector 2622 may extend from the left side wall 2612 of the open-faced, closed-ended PCD docking pocket 2610. The multi-pin connector array 2622 may be sized and shaped to removably engage a correspondingly sized and shaped multi-pin connector array, e.g., the multi-pin connector array 130 illustrated in FIG. 3, the multi-pin connector array 132 illustrated in FIG. 4, a combination thereof, or some other type of multi-pin connector array known in the art.

As shown in FIG. 26 and FIG. 27, the open-faced, closed-ended PCD docking pocket 2610 may also include a latch assembly 2624 that extends over an edge of one of the side walls 2612, 2614, 2616, 2618. In the aspect as shown in FIG. 26 and FIG. 27, the latch assembly 2624 may extend over the edge of the right side wall 2614 of the open-faced, closed-ended PCD docking pocket 2610 opposite the left side wall 2612 of the open-faced, closed-ended PCD docking pocket 2610. The latch assembly 2624 may be spring loaded and slidably disposed in the surface of the lower housing portion 2604 of the housing 2602. In the aspect as shown, the latch assembly 2624 may be moved in a direction, e.g., to the right, in order to allow a PCD, e.g., the PCD 100 shown in FIG. 1 through FIG. 4, to be inserted into the open-faced, closed-ended PCD docking pocket 2610. Thereafter, when released, the latch assembly 2624 may move in the opposite direction, e.g., to the left. The latch assembly 2624 may then engage an upper surface of the PCD 100 in order to maintain the PCD 100 within the PCD docking pocket 2610. FIG. 27 illustrates the PCD 100 engaged with the PCD docking station 2600.

As shown, the PCD 100 may be installed within the open-faced, closed-ended docking pocket 2610 as described herein. When the PCD 100 is installed within the docking pocket 2610, the multi-pin connector array 130 of the PCD 100 may be engaged with the multi-pin connector array 2622 formed in the open-faced, closed-ended docking pocket 2610.

In a particular aspect, when the PCD 100 is docked with the PCD docking station 2600, the PCD 100 may be used as a supplemental display. Further, the PCD 100 may be used as an input device, e.g., the PCD 100 may be used as a mouse pad and may include a first mouse button and a second mouse button. Also, the PCD 100 may be used as a supplemental display and as a mouse pad with corresponding mouse buttons.

It may be appreciated that when the PCD 100 is docked with the PCD docking station 2600 the combination may be considered a mobile computing device (MCD), e.g., a laptop computing device. Further, the combination of the PCD 100 and the PCD docking station 2600 is portable and the housing 2602 of the PCD docking station 2600 may be closed while the PCD 100 is docked with the PCD docking station 2600. Also, the PCD docking station 2600 may include a switch, e.g., a push button switch, within the open-faced, closed-ended docking pocket 2610. When the PCD 100 is installed within the open-faced, closed-ended docking pocket 2610, the PCD 100 can close the switch and cause the PCD docking station 2600 to be powered on, e.g., energized. When the PCD 100 is ejected, or otherwise removed, from the open-faced, closed-ended docking pocket 2610, the PCD docking station 2600 may be powered off. In another aspect, simply engaging the PCD 100 with the multi-pin connector array 2622 may cause the PCD docking station 2600 to be powered on. Disengaging the PCD 100 from the multi-pin connector array 2622 may cause the PCD docking station 2600 to be powered off.

Figure 28:
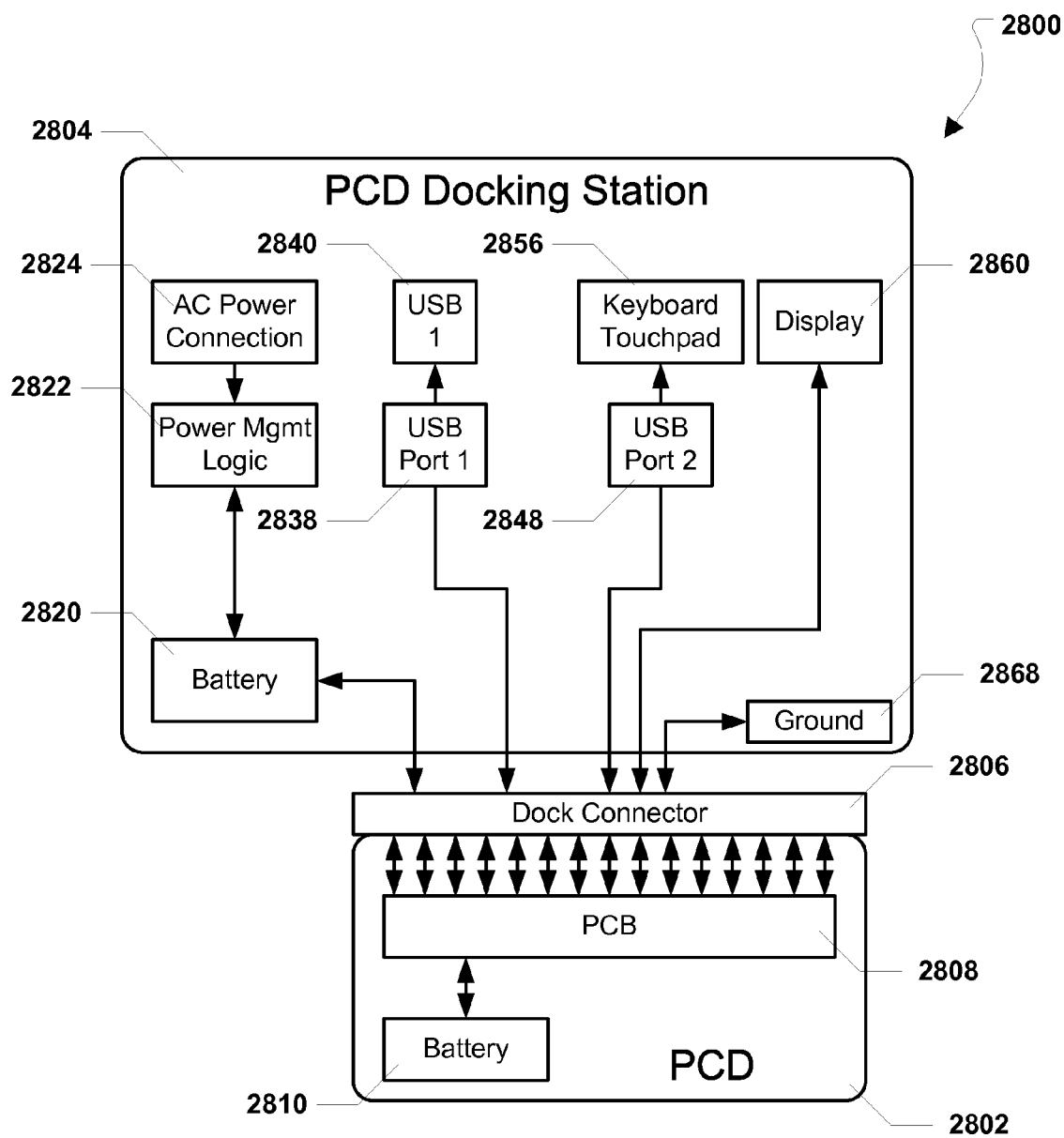
FIG. 28 is a block diagram of a first aspect of a PCD/PCD docking station system.

FIG. 28 depicts a first aspect of a PCD system, generally designated 2800. As shown, the PCD system 2800 may include a PCD 2802 and a PCD docking station 2804. In a particular aspect, the PCD 2802 may be removably engaged with the PCD docking station 2804 via a dock connector 2806. The dock connector 2806 may provide electronic connectivity between one or more components within the PCD 2802 and one or more components within the PCD docking station 2804. Additionally, the dock connector 2806 may be a multi-pin dock connector 2806. Further, the dock connector 2806 may be one of the multi-pin connector arrays described herein.

As shown in FIG. 28, the PCD 2802 may include a printed circuit board (PCB) 2808 that may include the PCD electronic components. The PCD electronic components may be packaged as a system-on-chip (SOC) or some other appropriate device that integrates and connects the electronic components in order to control the PCD 2802. The PCB 2808 may include one or more of the components described in conjunction with FIG. 5. A battery 2810 may be coupled to the PCB 2808.

FIG. 28 indicates that the PCD docking station 2804 may include a battery 2820 connected to the dock connector 2806. A power management module 2822 may be connected to the battery 2820. Further, an alternating current (AC) power connection 2824 may be connected to the power management module 2822. The AC power connection 2824 may be connected to an AC power source (not shown).

FIG. 28 further shows that a first universal serial bus-high speed (USB-HS) port 2838 may be connected to the dock connector 2806. A first USB connector 2840 may be connected to the first USB-HS port 2838. As depicted in FIG. 28, the PCD docking station 2804 may also include a second USB-HS port 2848. A keyboard 2856 may be connected to the second USB-HS port 2848. In particular, the keyboard 2856 may be a keyboard/touchpad combination.

FIG. 28 indicates that the PCD docking station 2804 may also include a display 2860 connected to the dock connector 2806. As shown, the dock connector 2806 may be further connected to a ground connection 2868.

In a particular aspect, the dock connector 2806 may include forty-four (44) pins. For example, the dock connector 2806 may include eight (8) pins for the battery 2820, four (4) pins for the first USB-HS port 2838, four (4) pins for the second USB-HS port 2848, twenty (20) pins for the display 2860, and eight (8) pins for the ground connection 2868.

Figure 29:
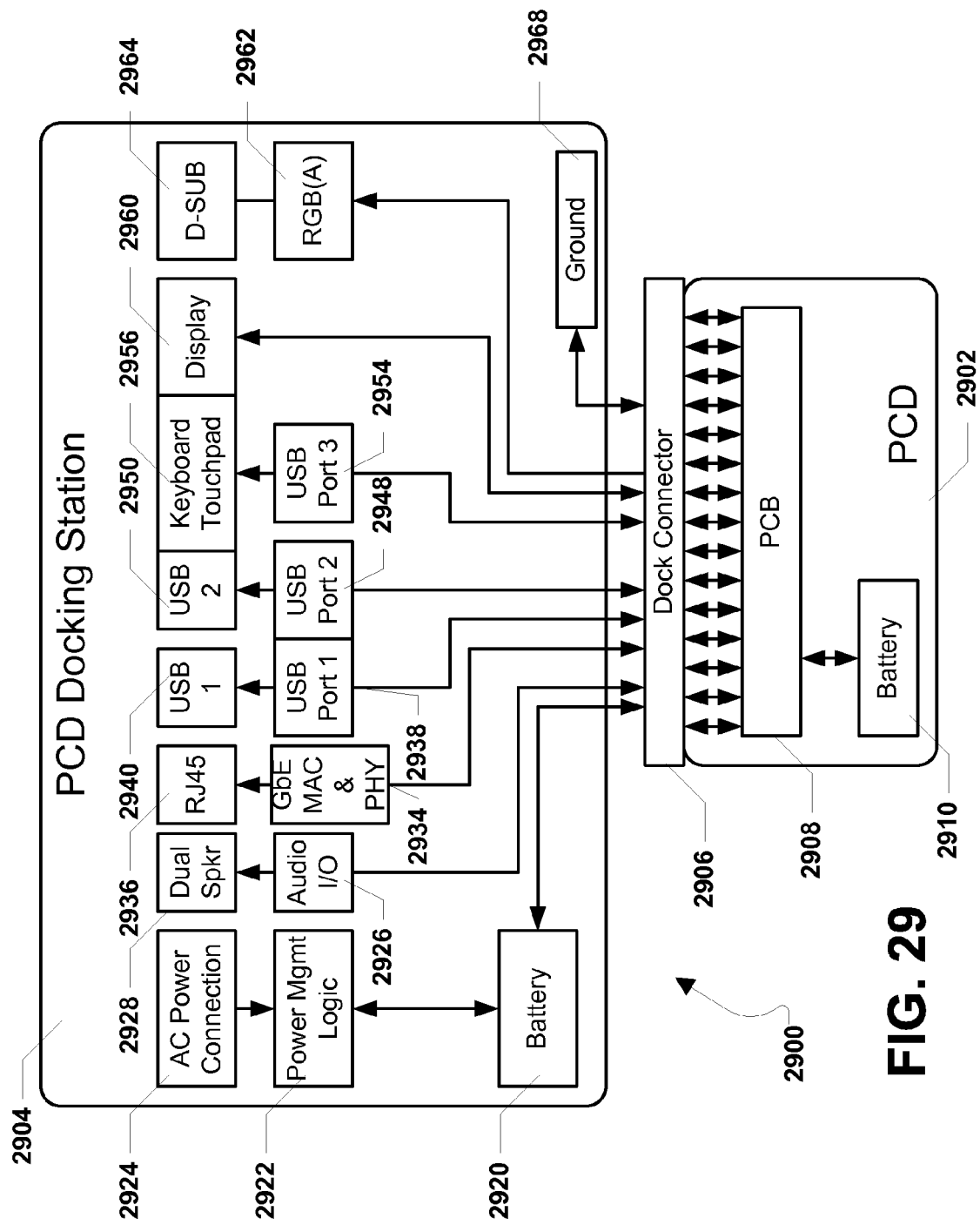
FIG. 29 is a block diagram of a second aspect of a PCD/PCD docking station system.

Referring to FIG. 29, a second aspect of a PCD system is shown and is generally designated 2900. As shown, the PCD system 2900 may include a PCD 2902 and a PCD docking station 2904. In a particular aspect, the PCD 2902 may be removably engaged with the PCD docking station 2904 via a dock connector 2906. The dock connector 2906 may provide electronic connectivity between one or more components within the PCD 2902 and one or more components within the PCD docking station 2904.

As shown in FIG. 29, the PCD 2902 may include a printed circuit board (PCB) 2908 that may include the PCD electronic components. The PCD electronic components may be packaged as a system-on-chip (SOC) or some other appropriate device that integrates and connects the electronic components in order to control the PCD 2902. Further, the PCB 2908 may include one or more of the components described in conjunction with FIG. 5. A battery 2910 may be coupled to the PCB 2908.

FIG. 29 indicates that the PCD docking station 2904 may include a battery 2920 connected to the dock connector 2906. A power management module 2922 may be connected to the battery 2920. Further, an alternating current (AC) power connection 2924 may be connected to the power management module 2922. The AC power connection 2924 may be connected to an AC power source (not shown). An audio input/output (I/O) 2926 may be connected to the dock connector 2906 and one or more speakers 2928 may be connected to the audio I/O 2926.

As illustrated, a Gigabit Ethernet Media Access Controller (GbE MAC) 2934 may also be connected to the dock connector 2906. An Ethernet port 2936 may be connected to the GbE MAC 2934. In a particular aspect, the Ethernet port 2936 may be an RJ45 jack.

FIG. 29 further shows that a first universal serial bus-high speed (USB-HS) port 2938 may be connected to the dock connector 2906. A first USB connector 2940 may be connected to the first USB-HS port 2938. As depicted in FIG. 29, the PCD docking station 2904 may also include a second USB-HS port 2948. A second USB connector 2950 may be connected to the second USB-HS port 2948. Moreover, as depicted, a third USB-HS port 2954 may be connected to the dock connector 2906. A keyboard 2956 may be connected to the third USB-HS port 2954. In particular, the keyboard 2956 may be a keyboard/touchpad combination.

FIG. 29 indicates that the PCD docking station 2904 may also include a display 2960. Additionally, the PCD docking station 2904 may include an RGB(A) connector 2962 coupled to the dock connector 2906. A D-sub connector 2964 may be connected to the RGB(A) connector 2962. As shown, the dock connector 2906 may be connected to a ground connection 2968.

In a particular aspect, the dock connector 2906 may include one hundred nineteen (119) pins. For example, the dock connector 2906 may include ten (10) pins for the battery 2920, three (3) pins for the audio I/O 2926, thirty-six (36) pins for the GbE MAC 2934, four (4) pins for the first USB-HS port 2938, four (4) pins for the second USB-HS port 2948, four (4) pins for the third USB-HS port 2954, twenty (20) pins for the display 2960, twenty-eight (28) pins for the RGB(A) connector 2962, and ten (10) pins for the ground connection 2968.

Figure 30:
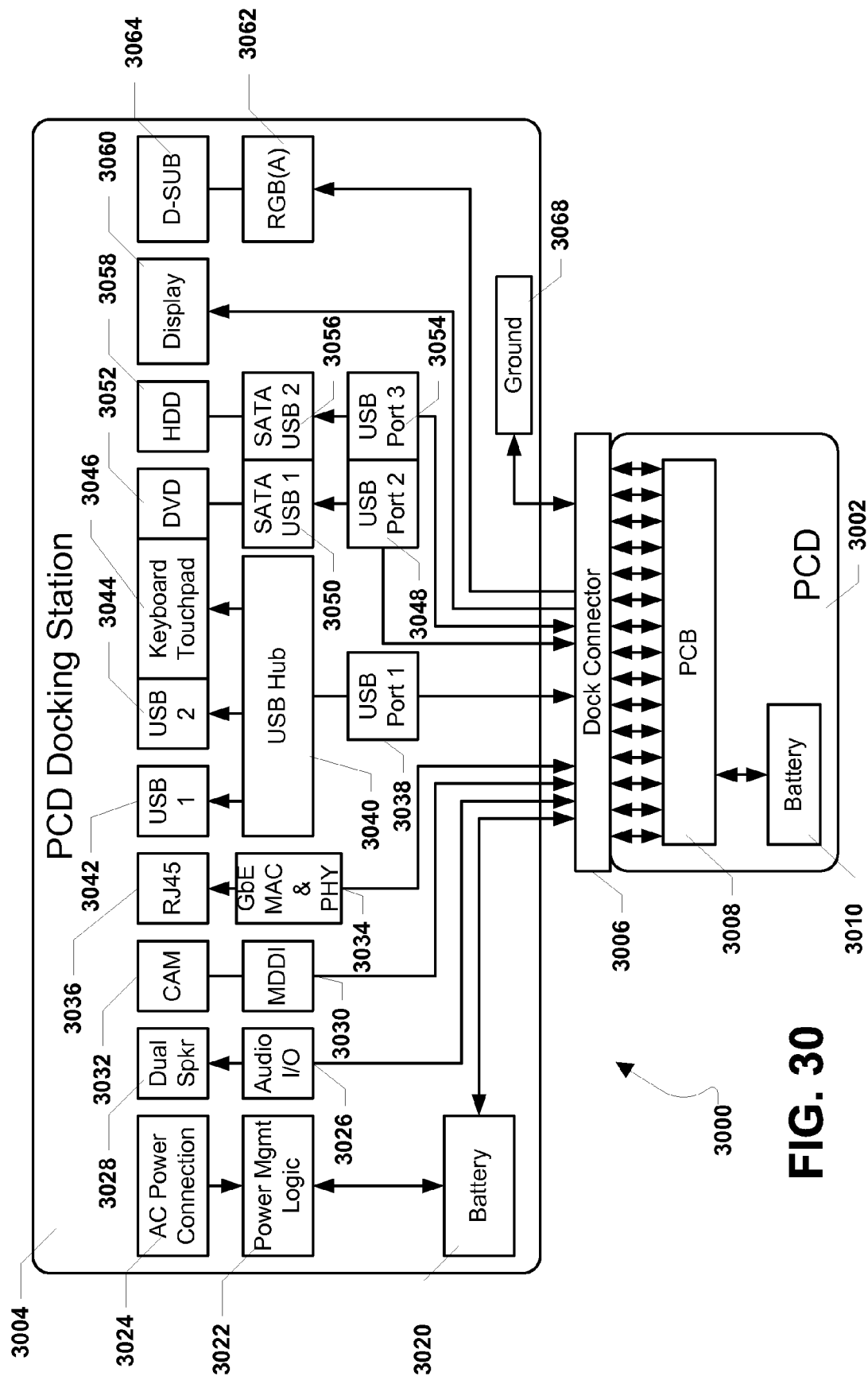
FIG. 30 is a block diagram of a third aspect of a PCD/PCD docking station system.

FIG. 30 illustrates a third aspect of a PCD system, generally designated 3000. As shown, the PCD system 3000 may include a PCD 3002 and a PCD docking station 3004. In a particular aspect, the PCD 3002 may be removably engaged with the PCD docking station 3004 via a dock connector 3006. The dock connector 3006 may provide electronic connectivity between one or more components within the PCD 3002 and one or more components within the PCD docking station 3004.

As shown in FIG. 30, the PCD 3002 may include a printed circuit board (PCB) 3008 that may include the PCD electronic components. The PCD electronic components may be packaged as a system-on-chip (SOC) or some other appropriate device that integrates and connects the electronic components in order to control the PCD 3002. Further, the PCB 3008 may include one or more of the components described in conjunction with FIG. 5. A battery 3010 may be coupled to the PCB 3008.

FIG. 30 indicates that the PCD docking station 3004 may include a battery 3020 connected to the dock connector 3006. A power management module 3022 may be connected to the battery 3020. Further, an alternating current (AC) power connection 3024 may be connected to the power management module 3022. The AC power connection 3024 may be connected to an AC power source (not shown). An audio input/output (I/O) 3026 may be connected to the dock connector 3006 and one or more speakers 3028 may be connected to the audio I/O 3026.

As further illustrated in FIG. 30, a mobile display digital interface (MDDI) 3030 may be connected to the dock connector 3006. A camera 3032 may be connected to the MDDI 3030. Further, a Gigabit Ethernet Media Access Controller (GbE MAC) 3034 may also be connected to the dock connector. An Ethernet port 3036 may be connected to the GbE MAC 3034. In a particular aspect, the Ethernet port 3036 may be an RJ45 jack.

FIG. 30 further shows that a first universal serial bus-high speed (USB-HS) port 3038 may be connected to the dock connector 3006. A USB hub 3040 may be connected to the first USB-HS port 3038. A first USB connector 3042 and a second USB connector 3044 may be connected to the USB hub 3040. Additionally, a keyboard 3046 may be connected to the USB hub 3040. In particular, the keyboard 3046 may be a keyboard/touchpad combination.

As depicted in FIG. 30, the PCD docking station 3004 may also include a second USB-HS port 3048. A first serial advanced technology attachment (SATA) to USB converter 3050 may be connected to the second USB-HS port 3048. A digital video disk (DVD) drive 3052 may be connected to the first SATA-USB converter 3050. Further, the PCD docking station 3004 may include a third USB-HS port 3054. A second SATA-USB converter 3056 may be connected to the third USB-HS port 3054 and a hard disk drive (HDD) 3058 may be connected to the third USB-HS port 3054.

FIG. 30 indicates that the PCD docking station 3004 may also include a display 3060. Additionally, the PCD docking station 3004 may include an RGB(A) connector 3062 coupled to the dock connector 3006. A D-sub connector 3064 may be connected to the RGB(A) connector 3062. As shown, the dock connector 3006 may be connected to a ground connection 3068.

In a particular aspect, the dock connector 3006 may include one hundred twenty-seven (127) pins. For example, the dock connector 3006 may include ten (10) pins for the battery 3020, five (5) pins for the audio I/O 3026, six (6) pins for the MDDI 3030, thirty-six (36) pins for the GbE MAC 3034, four (4) pins for the first USB-HS port 3038, four (4) pins for the second USB-HS port 3048, four (4) pins for the third USB-HS port 3054, twenty (20) pins for the display 3060, twenty-eight (28) pins for the RGB(A) connector 3062, and ten (10) pins for the ground connection 3068. The dock connector 3006 may also include an additional three (3) pins for the SATA 3050 connected to the second USB-HS port 3048.

Figure 31:
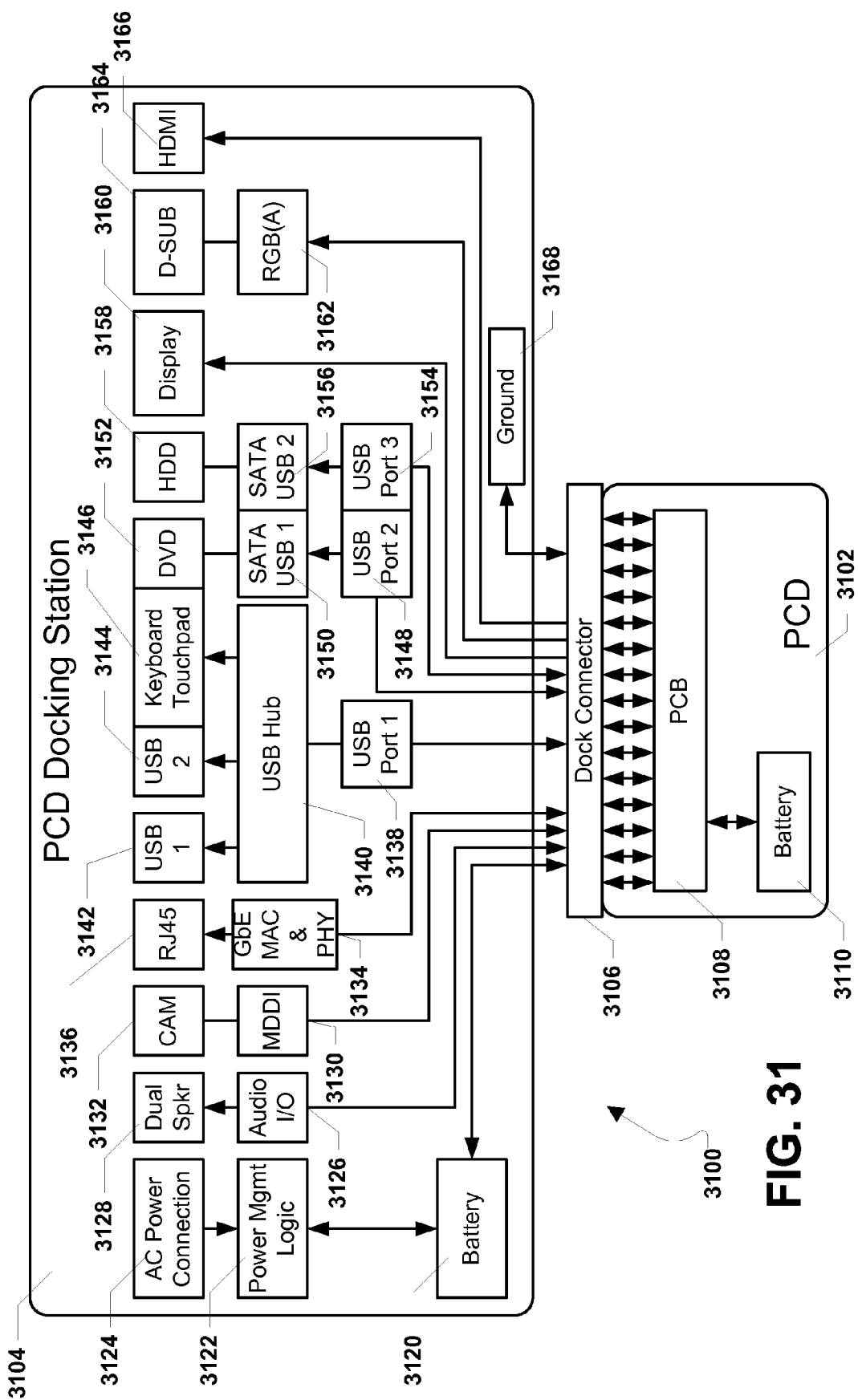
FIG. 31 is a block diagram of a fourth aspect of a PCD/PCD docking station system.

Referring now to FIG. 31, a fourth aspect of a PCD system is shown and is generally designated 3100. As shown, the PCD system 3100 may include a PCD 3102 and a PCD docking station 3104. In a particular aspect, the PCD 3102 may be removably engaged with the PCD docking station 3104 via a dock connector 3106. The dock connector 3106 may provide electronic connectivity between one or more components within the PCD 3102 and one or more components within the PCD docking station 3104.

As shown in FIG. 31, the PCD 3102 may include a printed circuit board (PCB) 3108 that may include the PCD electronic components. The PCD electronic components may be packaged as a system-on-chip (SOC) or some other appropriate device that integrates and connects the electronic components in order to control the PCD 3102. Further, the PCB 3108 may include one or more of the components described in conjunction with FIG. 5. A battery 3110 may be coupled to the PCB 3108.

FIG. 31 indicates that the PCD docking station 3104 may include a battery 3120 connected to the dock connector 3106. A power management module 3122 may be connected to the battery 3120. Further, an alternating current (AC) power connection 3124 may be connected to the power management module 3122. The AC power connection 3124 may be connected to an AC power source (not shown). An audio input/output (I/O) 3126 may be connected to the dock connector 3106 and one or more speakers 3128 may be connected to the audio I/O 3126.

As further illustrated in FIG. 31, a mobile display digital interface (MDDI) 3130 may be connected to the dock connector 3106. A camera 3132 may be connected to the MDDI 3130. Further, a Gigabit Ethernet Media Access Controller (GbE MAC) 3134 may also be connected to the dock connector. An Ethernet port 3136 may be connected to the GbE MAC 3134. In a particular aspect, the Ethernet port 3136 may be an RJ45 jack.

FIG. 31 further shows that a first universal serial bus-high speed (USB-HS) port 3138 may be connected to the dock connector 3106. A USB hub 3140 may be connected to the first USB-HS port 3138. A first USB connector 3142 and a second USB connector 3144 may be connected to the USB hub 3140. Additionally, a keyboard 3146 may be connected to the USB hub 3140. In particular, the keyboard 3146 may be a keyboard/touchpad combination.

As depicted in FIG. 31, the PCD docking station 3104 may also include a second USB-HS port 3148. A first serial advanced technology attachment (SATA) to USB converter 3150 may be connected to the second USB-HS port 3148. A digital video disk (DVD) drive 3152 may be connected to the first SATA-USB converter 3150. Further, the PCD docking station 3104 may include a third USB-HS port 3154. A second SATA-USB converter 3156 may be connected to the third USB-HS port 3154 and a hard disk drive (HDD) 3158 may be connected to the third USB-HS port 3154.

FIG. 31 indicates that the PCD docking station 3104 may also include a display 3160. Additionally, the PCD docking station 3104 may include an RGB(A) connector 3162 coupled to the dock connector 3106. A D-sub connector 3164 may be connected to the RGB(A) connector 3162. A high-definition multimedia interface (HDMI) 3166 may also be connected to the dock connector 3106. As shown, the dock connector 3106 may be connected to a ground connection 3168.

In a particular aspect, the dock connector 3106 may include one hundred forty-six (146) pins. For example, the dock connector 3106 may include ten (10) pins for the battery 3120, five (5) pins for the audio I/O 3126, six (6) pins for the MDDI 3130, thirty-six (36) pins for the GbE MAC 3134, four (4) pins for the first USB-HS port 3138, four (4) pins for the second USB-HS port 3148, four (4) pins for the third USB- HS port 3154, twenty (20) pins for the display 3160, twenty-eight (28) pins for the RGB(A) connector 3162, nineteen (19) pins for the HDMI 3166, and ten (10) pins for the ground connection 3168. The dock connector 3106 may also include an additional three (3) pins for the SATA 3150 connected to the second USB-HS port 3148.

Figure 32:
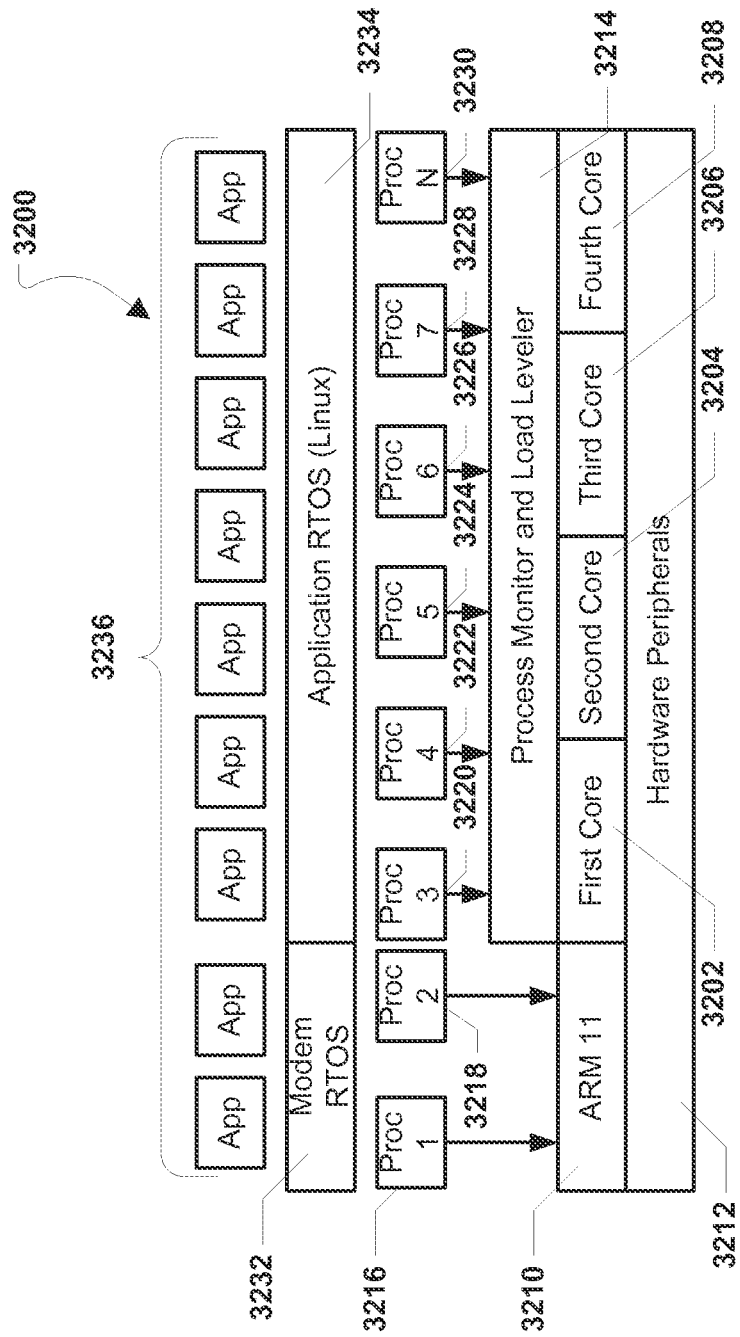
FIG. 32 is a block diagram of a second aspect of a PCD.

Referring to FIG. 32, a PCD processor system is shown and is generally designated 3200. As shown, the PCD processor system 3200 may include a first core processor 3202, a second core processor 3204, a third core processor 3206, and a fourth core processor 3208. Further, the PCD processor system 3200 may include a 32-bit processor 3210, e.g., an ARM 11 processor.

As shown, one or more hardware peripherals 3212 may be connected to the first core processor 3202, the second core processor 3204, the third core processor 3206, the fourth core processor 3208, the 32-bit processor 3210, or a combination thereof. In a particular aspect, a process monitor and load leveler 3214 may be connected to the first core processor 3202, the second core processor 3204, the third core processor 3206, and the fourth core processor 3208. As described herein, the process monitor and load leveler 3214 may act as a processor manager to turn the core processors 3202, 3204, 3206, 3208 on and off depending on operational requirements, whether a PCD is docked, whether a PCD is undocked or a combination thereof. The process monitor and load leveler 3214 may act as a means for executing one or more of the method steps described herein.

FIG. 32 further indicates that a first process 3216 and a second process 3218 may be executed by the 32-bit processor 3210. A third process 3220, a fourth process 3222, a fifth process 3224, a sixth process 3226, a seventh process 3228, and an Nth process 3230 may be executed by the first core processor 3202, the second core processor 3204, the third core processor 3206, the fourth core processor 3208, or a combination thereof via the process monitor and load leveler 3214.

The PCD processor system 3200 may further include a modem real-time operating system (RTOS) 3232 that may operate above the first process 3216 and the second process 3218. An application RTOS 3234 may operate above the third process 3220, the fourth process 3222, the fifth process 3224, the sixth process 3226, the seventh process 3228, and the Nth process 3230. In a particular aspect, the application RTOS may be an RTOS provided by Linux™. A plurality of applications 3236 may be executed by the modem RTOS 3232 and the application RTOS 3234.

Figure 33:
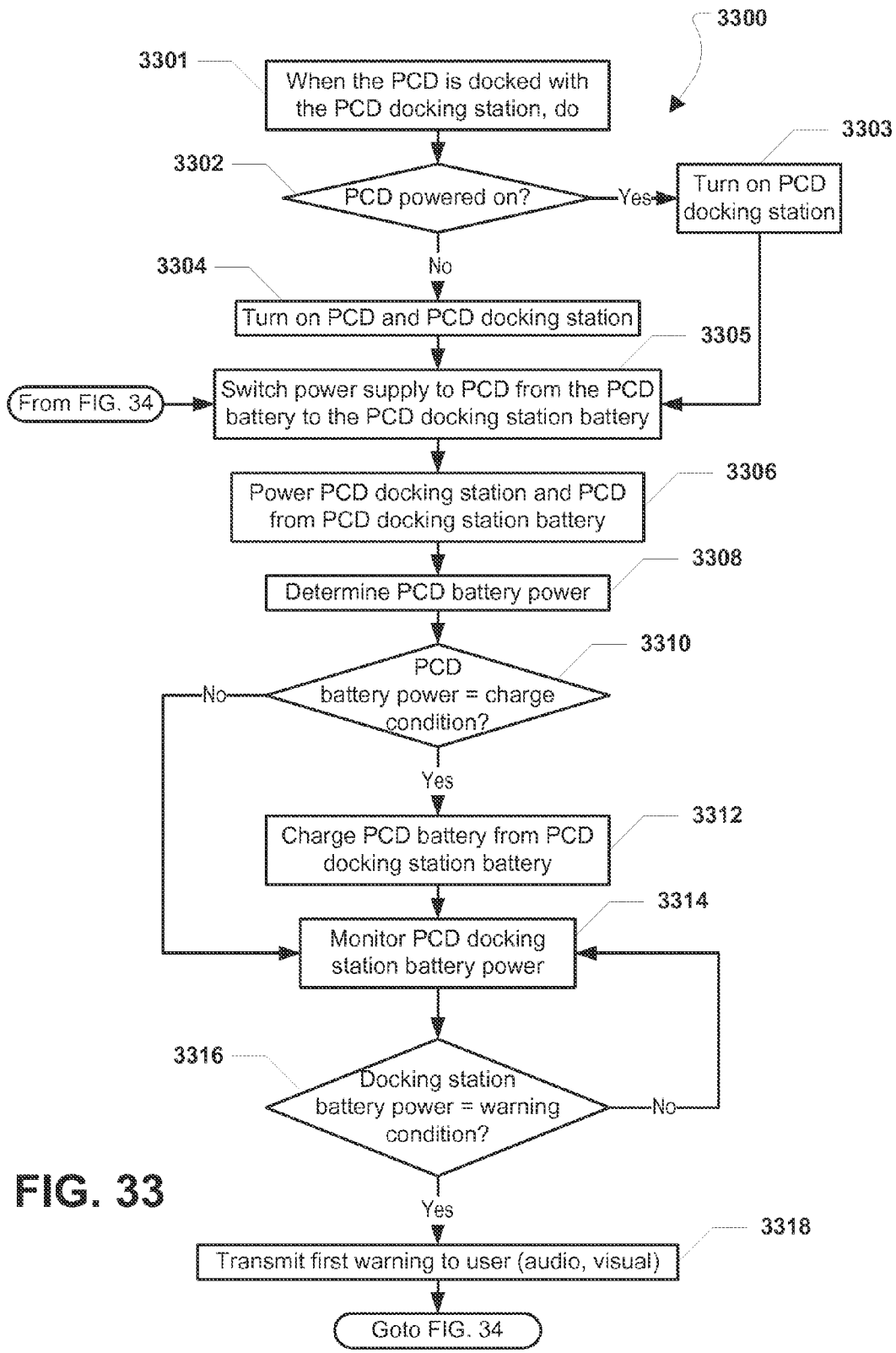
FIG. 33 is a first portion of a flowchart illustrating a method of managing power at a PCD and a PCD docking station.

Referring to FIG. 33, a method of managing power distribution between a PCD and a PCD docking station is shown and is generally designated 3300. Commencing at block 3301, a do loop may be entered in which when the PCD is docked with the PCD docking station, the following steps may be performed. At decision 3302, a power management module may determine whether the PCD is powered on. If so, the method may proceed to block 3303 and the PCD docking station may be turned on, e.g., by the power management module. Otherwise, the method may proceed to block 3304 and the PCD and the PCD docking station may be turned on, e.g., by the power management module. From block 3303 and block 3304, the method may proceed to block 3305.

At block 3305, the power supply to the PCD may be switched from the PCD battery to the PCD docking station battery. At block 3306, the PCD docking station and the PCD may be powered from the PCD docking station battery. Further, at block 3308, the PCD battery power may be determined, e.g., the remaining battery power of the PCD battery may be determined.

Moving to decision 3310, a power management module may determine whether the PCD battery power is equal to a charge condition. For example, the power management module may determine whether a remaining battery life is below a predetermined value, e.g., a percentage (%) of total PCD battery life. Also, the power management module may reside in a processor within the PCD.

Returning to the description of the method 3300, if the PCD battery power is equal to a charge condition, the method 3300 may proceed to block 3312 and the PCD battery may be charged from the PCD docking station battery. Thereafter, the method may continue to block 3314. Returning to decision 3310, if the PCD battery power is not equal to the charge condition, the method may move directly to block 3314.

At block 3314, the PCD docking station battery power may be monitored. Next, at decision 3316, the power management module may determine whether the docking station battery power is equal to a warning condition. For example, the power management module may determine whether a remaining battery power associated with the PCD docking station battery is below a predetermined value, e.g., a percentage (%) of total PCD docking station battery life.

Figure 34:
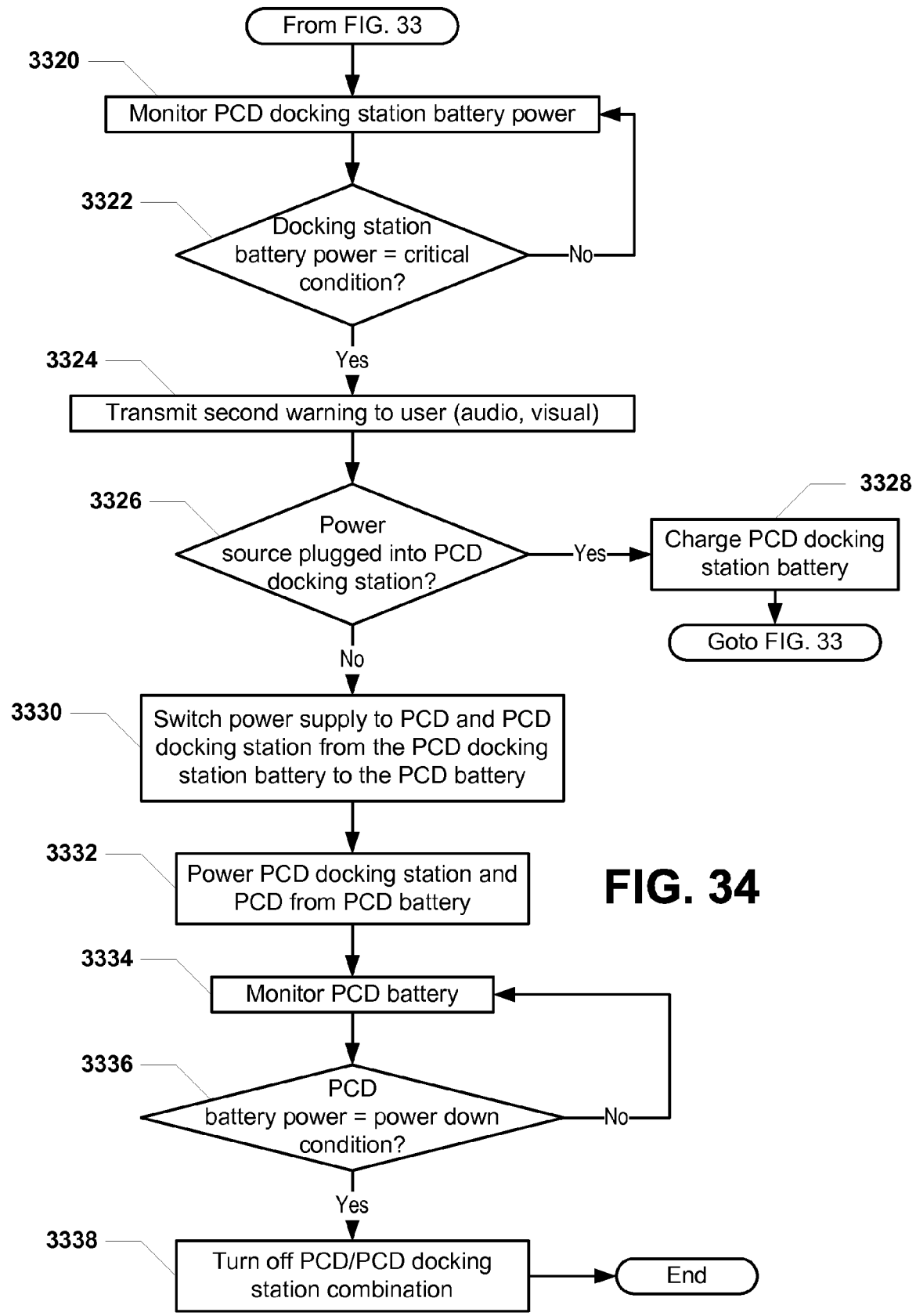
FIG. 34 is a second portion of a flowchart illustrating a method of managing power at a PCD and a PCD docking station.

If the docking station battery power is not equal to the warning condition, the method may return to block 3314 and continue as described herein. Otherwise, if the docking station battery power is equal to the warning condition, the method 3300 may move to block 3318 and the power management module may transmit a first warning to the user. The first warning may be an audio warning, a visual warning, or a combination thereof. From block 3318, the method 3300 may move to block 3320 of FIG. 34.

At block 3320, the power management module may monitor the PCD docking station battery power. Then, the method may move to decision 3322 and the power management module may determine whether the docking station battery power is equal to a critical condition. For example, the power management module may determine whether a remaining battery power associated with the PCD docking station battery is below a predetermined value, e.g., a percentage (%) of total PCD docking station battery life. If the PCD docking station battery power is not equal to the critical condition, the method 3300 may return to block 3320 and continue as described herein. Otherwise, if the PCD docking station battery power is equal to the critical condition, the method 3300 may proceed to block 3324 and the power management module may transmit a second warning to the user. The second warning may be an audio warning, a visual warning, or a combination thereof.

From block 3324, the method may continue to decision 3326 and the power management module may determine whether a power source is plugged into the PCD docking station. The power source may be an alternating current (A/C) power source, an external direct current (D/C) power source, or a combination thereof. If a power source is plugged into the PCD docking station, the method 3300 may continue to block 3328 and the power management module may charge the PCD docking station battery from the power source. Thereafter, the method may return to block 3305 of FIG. 33 and continue as described herein.

Returning to decision 3326, if the power management module does not detect that a power source is plugged into the PCD docking station, the method 3300 may proceed to block 3330 and the power management module may switch the power supply to the PCD and the PCD docking station from the PCD docking station battery to the PCD battery. Next, at block 3332, the PCD docking station and the PCD may be powered from the PCD battery.

Moving to block 3334, the power management module may monitor the PCD battery power. At decision 3336, the power management module may determine whether the PCD battery power is equal to a power down condition. For example, the power management module may determine whether a remaining battery power associated with the PCD battery is below a predetermined value, e.g., a percentage (%) of total PCD battery life. If the PCD battery power is not equal to the power down condition, the method 3300 may return to block 3334 and continue as described herein. Conversely, if the PCD battery power is equal to the power down condition, the method 3300 may continue to block 3338 and the power management module may turn off the PCD/PCD docking station combination module. Then, the method 3300 may end.

With the configuration described herein, the PCD/PCD docking station combination provides feature segmentation between the PCD and the PCD docking station. A PCD may be engaged with a PCD docking station in one of the manners described herein. For example, a PCD may be engaged with a PCD engagement mechanism, e.g., a PCD docking pocket, a PCD docking tray, or a similar mechanism. Further, dual display usage is provided, e.g., by a display in a PCD and a display in a PCD docking station. When engaged with a PCD docking station, a PCD may be charged by the PCD docking station. Moreover, seamless user interface and application transition may be provided as the PCD is docked or undocked.

In a particular aspect, user interface features may be provided when a PCD is docked or undocked. One such aspect, is a "fish-eye" bubble that may be provided across all applications displayed on the PCD. Additionally, application layer scaling may be provided. For example, a primary application version may be executed when a PCD is docked and a secondary application version may be executed when a PCD is undocked. Alternatively, a standard application version may be executed when a PCD is undocked and an enhanced application version may be executed when a PCD is docked. In an undocked mode, a PCD may execute less computational intensive, smaller footprint applications. In a docked mode, full functionality applications may be executed by the PCD. Whether a PCD is docked or undocked may be automatically detected and the appropriate application versions may be executed when available.

When a PCD is undocked, two low power processors may be used for small screen applications and the PCD operating system (OS). Further, two high performance processors may be used to execute larger applications when the PCD is docked with a PCD docking station. In another aspect, when the PCD is docked, one processor may be used for mouse controls and graphical user interface controls, i.e., touch screen controls; one processor may be used for shared input/output controls; one processor be used for a PCD OS; and one processor may be used for a desktop OS stored on a PCD docking station. In yet another aspect, each processor may run a different OS and framework.

A PCD docking station may be connected to a home network and when a PCD is docked with the PCD docking station, the PCD may, in turn, be connected to the home network. Moreover, data, e.g., applications, content, or a combination thereof, may be automatically backed up to a PCD docking station when a PCD is docked with the PCD docking station. A PCD docking station may include a display, a display buffer, a HDD, additional memory, LAN capabilities, WLAN capabilities, one or more USB ports, printer connections, a keyboard, a mouse, etc. The PCD docking station may include a large screen application memory. A large screen application and an OS state may be retained in the PCD docking station memory when the PCD is undocked in order to enable instant-on when the PCD is again docked. A large screen application may include a browser application, a word processor application, a spreadsheet application, a presentation application, an email application, a calendar application, a video application, or a combination thereof. A small screen application may include a media player application, a phone application, a control application, or a combination thereof.

When a PCD is docked with a PCD docking station, a user can take advantage of a relatively larger display incorporated into the PCD docking station. Further, a user may use a full keyboard and mouse to access data stored in the PCD. A PCD docking station may be incorporated into a vehicle, a kiosk, a set top box, etc. and a PCD may be docked therewith.

It is to be understood that the method steps described herein need not necessarily be performed in the order as described. Further, words such as "thereafter," "then," "next," etc. are not intended to limit the order of the steps. These words are simply used to guide the reader through the description of the method steps.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims. cm What is claimed is:

What is claimed is:
1. A method of managing power distribution between a portable computing device (PCD) and a PCD docking station, the method comprising:
   determining whether the PCD is docked with the PCD docking station;
   switching a power supply to the PCD from a PCD battery to a PCD docking station battery in response to determining that the PCD is docked with the PCD docking station;

powering the PCD and the PCD docking station from the PCD docking station battery;
determining whether a PCD battery power equals a charge condition;
charging the PCD battery from the PCD docking station battery when the PCD battery power equals the charge condition;
monitoring a PCD docking station battery power;
determining whether the PCD docking station battery power equals a warning condition;
transmitting a first warning when the PCD docking station battery power equals the warning condition;
determining whether the PCD docking station battery power equals a critical condition;
transmitting a second warning when the PCD docking station battery power equals the critical condition;
determining whether an external power source is connected to the PCD docking station after transmitting the second warning; and
when it determined that the external power source is not connected to the PCD docking station:
   switching the power supply to the PCD and the PCD docking station from the PCD docking station battery to the PCD battery; and
   powering the PCD and the PCD docking station from the PCD battery.

2. The method of claim 1, further comprising:
charging the PCD docking station battery when the external power source is connected.

3. The method of claim 1, further comprising:
monitoring the PCD battery power; and
determining whether the PCD battery power equals a power down condition.

4. The method of claim 3, further comprising:
transmitting a third warning when the PCD battery power equals the power down condition.

5. The method of claim 4, further comprising:
powering down the PCD and the PCD docking station when the PCD battery power equals the power down condition.

6. A portable computing device (PCD) comprising:
means for determining whether the PCD is docked with a PCD docking station;
means for switching a power supply to the PCD from a PCD battery to a PCD docking station battery in response to determining that the PCD is docked with the PCD docking station;
means for powering the PCD and the PCD docking station from the PCD docking station battery;
means for determining whether a PCD battery power equals a charge condition;
means for charging the PCD battery from the PCD docking station battery when the PCD battery power equals the charge condition;
means for monitoring a PCD docking station battery power;
means for determining whether the PCD docking station battery power equals a warning condition;
means for transmitting a first warning when the PCD docking station battery power equals the warning condition;
means for determining whether the PCD docking station battery power equals a critical condition;
means for transmitting a second warning when the PCD docking station battery power equals the critical condition;
means for determining whether an external power source is connected to the PCD docking station;
means for switching the power supply to the PCD and the PCD docking station from the PCD docking station battery to the PCD battery after transmitting the second warning and when the external power source is not connected to the PCD docking station; and
means for powering the PCD and the PCD docking station from the PCD battery.

7. The portable computing device of claim 6, further comprising:
means for charging the PCD docking station battery when the external power source is connected.

8. The portable computing device of claim 6, further comprising:
means for monitoring the PCD battery power; and
means for determining whether the PCD battery power equals a power down condition.

9. The portable computing device of claim 8, further comprising:
means for transmitting a third warning when the PCD battery power equals the power down condition.

10. The portable computing device of claim 9, further comprising:
means for powering down the PCD and the PCD docking station when the PCD battery power equals the power down condition.

11. A portable computing device (PCD) comprising:
a processor, wherein the processor is configured with software instructions to performs operations comprising:
determining whether the PCD is docked with a PCD docking station;
switching a power supply to the PCD from a PCD battery to a PCD docking station battery in response to determining that the PCD is docked with the PCD docking station;
powering the PCD and the PCD docking station from the PCD docking station battery;
determining whether a PCD battery power equals a charge condition;
charging the PCD battery from the PCD docking station battery when the PCD battery power equals the charge condition;
monitoring a PCD docking station battery power;
determining whether the PCD docking station battery power equals a warning condition;
transmitting a first warning when the PCD docking station battery power equals the warning condition;
determining whether the PCD docking station battery power equals a critical condition;
transmitting a second warning when the PCD docking station battery power equals the critical condition;
determining whether an external power source is connected to the PCD docking station after transmitting the second warning; and
when it determined that the external power source is not connected to the PCD docking station:
   switching the power supply to the PCD and the PCD docking station from the PCD docking station battery to the PCD battery; and
   powering the PCD and the PCD docking station from the PCD battery.

12. The portable computing device of claim 11, wherein the processor is further operable to:
charge the PCD docking station battery when the external power source is connected.

13. The portable computing device of claim 11, wherein the processor is further operable to:
monitor the PCD battery power; and determine whether the PCD battery power equals a power down condition.

14. The portable computing device of claim 13, wherein the processor is further operable to:
transmit a third warning when the PCD battery power equals the power down condition.

15. The portable computing device of claim 14, wherein the processor is further operable to:
power down the PCD and the PCD docking station when the PCD battery power equals the power down condition.

16. A non-transitory computer-readable storage medium having stored there computer-executable instructions configured to cause a processor to perform operations comprising:
determining whether a portable computing device (PCD) is docked with a PCD docking station;
switching a power supply to the PCD from a PCD battery to a PCD docking station battery in response to determining that the PCD is docked with the PCD docking station;
powering the PCD and the PCD docking station from the PCD docking station battery;
determining whether a PCD battery power equals a charge condition;
charging the PCD battery from the PCD docking station battery when the PCD battery power equals the charge condition;
monitoring a PCD docking station battery power;
determining whether the PCD docking station battery power equals a warning condition;
transmitting a first warning when the PCD docking station battery power equals the warning condition;
determining whether the PCD docking station battery power equals a critical condition;
transmitting a second warning when the PCD docking station battery power equals the critical condition;
determining whether an external power source is connected to the PCD docking station after transmitting the second warning; and
when it determined that the external power source is not connected to the PCD docking station:
switching the power supply to the PCD and the PCD docking station from the PCD docking station battery to the PCD battery; and
powering the PCD and the PCD docking station from the PCD battery.

17. The non-transitory computer-readable storage medium of claim 16, wherein the stored computer-executable instructions are further configured to cause the processor to perform operations comprising:
charging the PCD docking station battery when the external power source is connected.

18. The non-transitory computer-readable storage medium of claim 16, wherein the stored computer-executable instructions are further configured to cause the processor to perform operations comprising:
monitoring the PCD battery power; and
determining whether the PCD battery power equals a power down condition.

19. The non-transitory computer-readable storage medium of claim 18, wherein the stored computer-executable instructions are further configured to cause the processor to perform operations comprising:
transmitting a third warning when the PCD battery power equals the power down condition.

20. The non-transitory computer-readable storage medium of claim 19, wherein the stored computer-executable instructions are further configured to cause the processor to perform operations comprising:
powering down the PCD and the PCD docking station when the PCD battery power equals the power down condition.

* * * * *